(12) United States Patent
Kwon

(10) Patent No.: US 12,388,243 B2
(45) Date of Patent: Aug. 12, 2025

(54) TRAP-TYPE LIVE WIRE TERMINAL INSULATION CAP AND INDIRECT LIVE WIRE INSULATION METHOD FOR JUMPER WIRE USING SAME

(71) Applicants: DAEWON ELECTRIC CO.,LTD., Cheongju-si Chungcheongbuk-do (KR); DAEWON INDUSTRY COMPANY, Jeungpyeong-gun Chungcheonbuk-do (KR)

(72) Inventor: Se Won Kwon, Jeungpyeong-gun Chungcheongbuk-do (KR)

(73) Assignees: DAEWON ELECTRIC CO., LTD., Cheongju-si (KR); DAEWON INDUSTRY COMPANY, Jeungpyeong-Gun (KR)

( * ) Notice: Subject to any disclaimer, the term of this patent is extended or adjusted under 35 U.S.C. 154(b) by 205 days.

(21) Appl. No.: 18/282,422

(22) PCT Filed: Dec. 23, 2021

(86) PCT No.: PCT/KR2021/019694
§ 371 (c)(1),
(2) Date: Sep. 15, 2023

(87) PCT Pub. No.: WO2022/196901
PCT Pub. Date: Sep. 22, 2022

(65) Prior Publication Data
US 2024/0162695 A1   May 16, 2024

(30) Foreign Application Priority Data
Mar. 17, 2021 (KR) .......................... 10-2021-0034490

(51) Int. Cl.
*H01B 17/38* (2006.01)
*H02G 1/02* (2006.01)

(52) U.S. Cl.
CPC ............... *H02G 1/02* (2013.01); *H01B 17/38* (2013.01)

(58) Field of Classification Search
CPC .................................. H02G 1/02; H01B 17/38
See application file for complete search history.

(56) References Cited

U.S. PATENT DOCUMENTS 4,835,342 A * 5/1989 Guginsky ............ H02G 3/0675
285/151.1
5,582,447 A * 12/1996 Leon ..................... F16G 11/103
292/307 R
(Continued)

FOREIGN PATENT DOCUMENTS

JP          4-10508 U     1/1992
JP          6-44254 Y2    11/1994
(Continued)

*Primary Examiner* — Sherman Ng
(74) *Attorney, Agent, or Firm* — Birch, Stewart, Kolasch & Birch, LLP

(57) ABSTRACT

Proposed is a trap-type live wire terminal insulation cap and an indirect live wire insulation method for a jumper wire using the same configured to easily insert and fix a jumper wire so that a charging part of the jumper wire is wrapped, insulated, and protected, in which the jumper wire is hung on an electric pole while a terminal charging part is exposed by cutting work during new installation, replacement, or repair of an electric wire. Furthermore, a plurality of gripping members forms a trap that is operated only in one direction, thereby being capable of preventing the electric wire from being separated and preventing safety incidents caused by high voltage current. Furthermore, the electric wire is capable of being easily fixed and released by a simple operation using an insulation stick, so that a safe and easy indirect live wire insulation method is realized.

19 Claims, 30 Drawing Sheets

(56) References Cited

U.S. PATENT DOCUMENTS

| | | | | |
|---|---|---|---|---|
| 5,792,987 | A * | 8/1998 | Dong | H02G 15/043 |
| | | | | 174/74 A |
| 5,832,158 | A * | 11/1998 | Chen | G02B 6/3825 |
| | | | | 385/87 |
| 6,126,478 | A * | 10/2000 | Presson | H01R 13/595 |
| | | | | 439/595 |
| 11,063,417 | B2 * | 7/2021 | Bier | H02G 15/043 |
| 2011/0097948 | A1 * | 4/2011 | Melni | H01R 4/56 |
| | | | | 439/733.1 |
| 2013/0217250 | A1 * | 8/2013 | Melni | H01R 11/11 |
| | | | | 439/271 |
| 2014/0127938 | A1 * | 5/2014 | De France | H01R 43/16 |
| | | | | 29/857 |
| 2018/0254623 | A1 | 9/2018 | Bier et al. | |

FOREIGN PATENT DOCUMENTS

| | | | |
|---|---|---|---|
| JP | 8-36932 | A | 2/1996 |
| JP | 9-74635 | A | 3/1997 |
| JP | 2006-121781 | A | 5/2006 |
| JP | 2007-288885 | A | 11/2007 |
| JP | 2007-295726 | A | 11/2007 |
| JP | 2008-123913 | A | 5/2008 |
| JP | 2014-45597 | A | 3/2014 |
| JP | 3198314 | U | 6/2015 |
| KR | 20-0147818 | Y1 | 6/1999 |
| KR | 20-0429996 | Y1 | 11/2006 |
| KR | 10-2007-0062827 | A | 6/2007 |
| KR | 10-2016-0046156 | A | 4/2016 |
| KR | 10-1777080 | B1 | 9/2017 |
| KR | 20-2019-0002699 | U | 10/2019 |
| KR | 10-2281030 | B1 | 7/2021 |
| KR | 10-2327599 | B1 | 11/2021 |

* cited by examiner

FIG. 14A
FIG. 14B
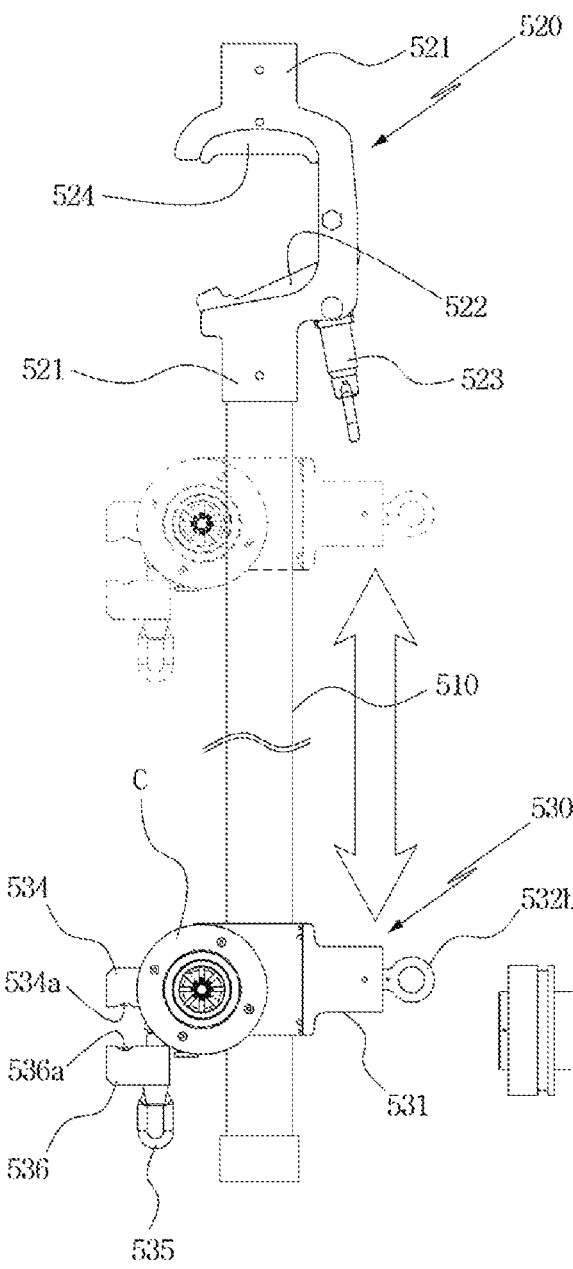
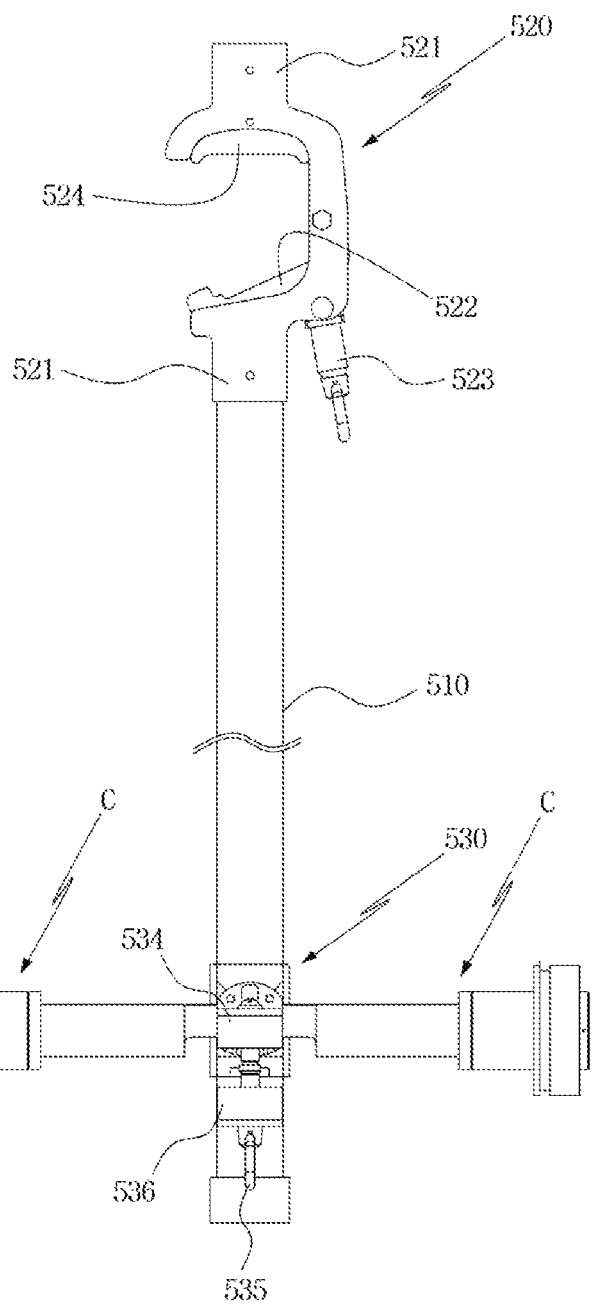

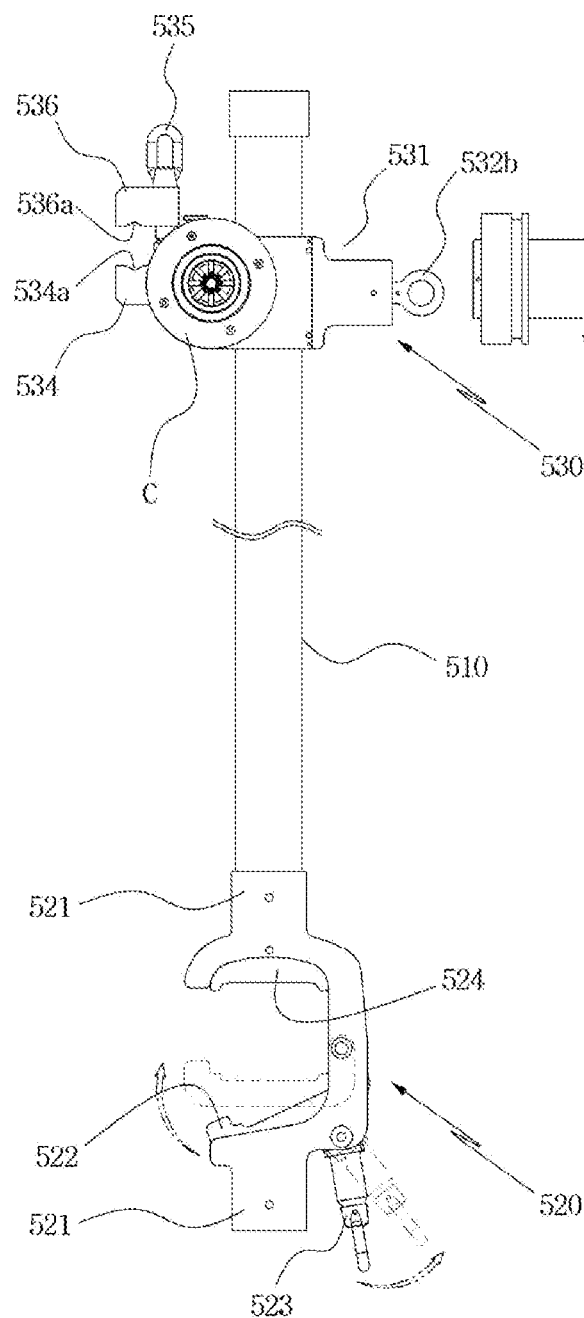
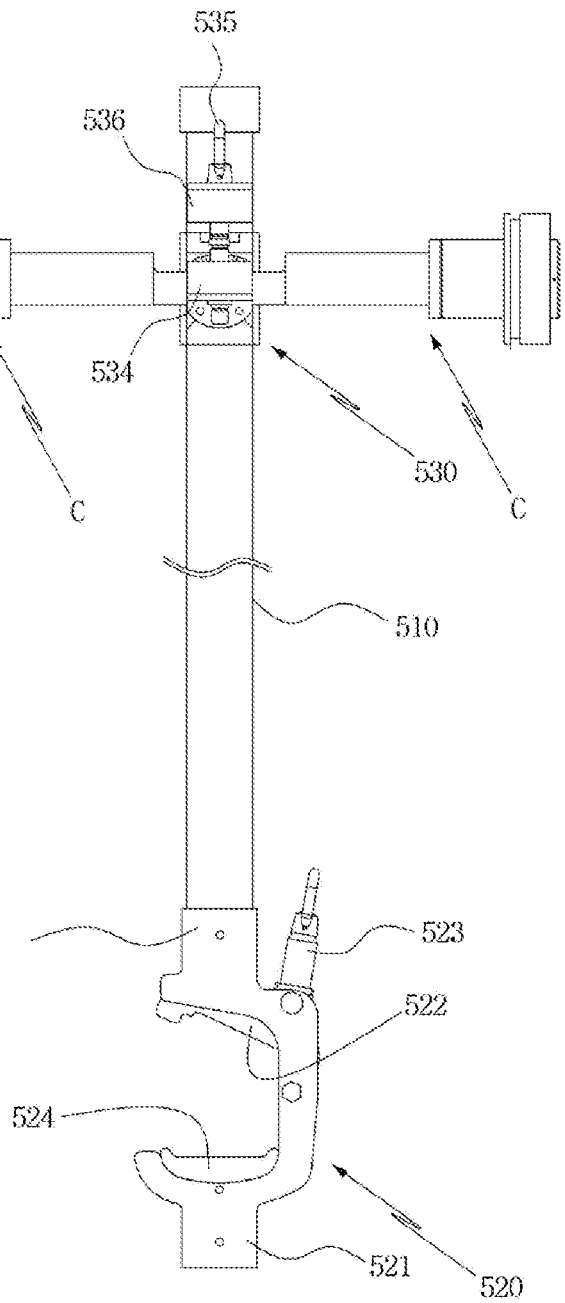

TRAP-TYPE LIVE WIRE TERMINAL INSULATION CAP AND INDIRECT LIVE WIRE INSULATION METHOD FOR JUMPER WIRE USING SAME

CROSS REFERENCE TO RELATED APPLICATIONS

This application is the National Phase of PCT International Application No. PCT/KR2021/019694, filed on Dec. 23, 2021, which claims priority under 35 U.S.C. 119 (a) to Patent Application No. 10-2021-0034490, filed in the Republic of Korea on Mar. 17, 2021, all of which are hereby expressly incorporated by reference into the present application.

TECHNICAL FIELD

The present disclosure relates to a trap-type live wire terminal insulation cap and an indirect live wire insulation method for a jumper wire using the trap-type live wire terminal insulation cap. More specifically, the present disclosure relates to a trap-type live wire terminal insulation cap and an indirect live wire insulation method using the trap-type live wire terminal insulation cap configured to easily insert and fix a charging part of an electric wire in a live wire state so that the charging part of the electric wire is capable of being wrapped, insulated, and protected, the electric wire being a jumper wire that is hung on an electric pole while a terminal charging part is exposed by cutting work during new installation, replacement, or repair of the electric wire. Furthermore, in the trap-type live wire terminal insulation cap, a plurality of gripping members is inserted such that the plurality of gripping members forms a trap that is operated only in one direction, so that the fixed electric wire is prevented from being separated and is maintained in a firmly fixed state, thereby being capable of preventing safety incidents caused by high voltage current. Furthermore, in the trap-type live wire terminal insulation cap, the electric wire is capable of being easily fixed and released by a simple operation using an insulation stick for an indirect live wire, so that a safe and easy indirect live wire insulation method is capable of being realized.

BACKGROUND ART

Generally, high power generated from a power plant is transmitted to each substation by a high-pressure electric power through a transmission line such as a transmission tower and so on. Next, in the substation, several processes of a transformation process are performed, and then an electric power distribution process for supplying electric power to each area by using cables is performed so that consumers in each home, each building, or the like are capable of using electric power.

At this time, electric power supply to general consumers is performed by supplying electric power through telegraph poles installed at a predetermined distance, and a span unit connection of power transmission and distribution electric wire cables of each telegraph pole is performed by using jumper wires.

That is, the power transmission and distribution electric wire cables to which the telegraph pole is to be connected is coupled through an insulator from both sides of a crossarm that is transversely installed on both sides of the upper end of the telegraph pole, the electric wires between the insulator is connected by the jumper wires, and the connected jumper wires are constructed such that the connected jumper wires are capable of being supported by the insulator installed on the crossarm.

The jumper wire may be required to be connected, cut, or replaced due to installation, replacement, or repair of various electric power distribution lines. At this time, since a high voltage current flows on the jumper wire, work is performed after a charging part of the cut jumper wire is insulated.

Meanwhile, as one of the technologies of an insulation cap for insulating a charging part of a new electric wire or a jumper wire, Korean Utility Model No. 20-0147818 (hereinafter, referred to as 'a conventional technology') has been proposed.

As illustrated in FIG. 1 and FIG. 2, in the conventional technology, a high voltage wire holder 10 configured to hold a high voltage wire 1 by inserting the cut high voltage wire 1 into the high voltage holder 10 and an insulation cap body configured to tighten the high voltage wire holder 10 inward when the high voltage wire holder 10 is inserted into the insulation cap body 20 are provided. Furthermore, in the high voltage wire holder 10, a slanted insertion hole 12 having a wide entrance and having a narrow inner side is formed on a center line of a head part 11 positioned at an upper side of the high voltage wire holder 10, a holding part 14 having a lower end portion formed in a conical shape and having an outer circumference provided with a male-threaded portion 13 is formed on a lower side of the head part 11 and is formed integrally with the head part 11, a holding hole in communication with the slanted insertion hole 12 is formed through an inner side of the holding part 14, and the holding part 14 has three to six cutout parts 16 in a radial direction. Furthermore, the insulation cap body 20 has an opened upper portion formed in a cylindrical shape and has an inner side provided with a female-threaded part 21 to which the male-threaded part 14 of the holding part 14 is fastened, and has a lower side provided with a space part 22 having a predetermined size.

As illustrated in FIG. 2, in a state in which the high voltage wire holder 10 is fastened to a terminal of the high voltage wire 1, the high voltage wire holder 10 is coupled to the insulation cap body 20, so that the terminal of the high voltage wire 1 is insulated.

However, in the conventional technology, since the insulated terminal is not fixed to a predetermined position, various problems such as a separation of the high voltage wire 1 may occur during work.

Therefore, generally, a method of fastening the insulated terminal to a wire positioned adjacent to the terminal. In this case, apart from an insulation process, a process of fixing the terminal of the high voltage wire 1 is required to be additionally performed, so that there is a problem that work time and cost for the fixing of the terminal of the high voltage wire 1 are further required.

In addition, in electric wire work, an insulated apparatus is used so as to perform the electric wire work. In this case, since several processes of work is required to be performed while the worker looking up the electric wire, there is a problem that the worker feels a lot of fatigue due to labor intensity and physical limits of the worker.

DISCLOSURE

Technical Problem

Accordingly, the present disclosure has been made keeping in mind the above problems occurring in the related art. Conventionally, an insulation cap configured to insulate a terminal of a cut electric wire has a problem that the terminal of the insulated electric wire is not fixed to a predetermined position so that separation of the electric wire and so on may occur, and has a problem that work time and cost are further required since a process of fixing the terminal of the cut electric wire is required to be performed.

In order to solve these problems, according to the present disclosure, there is provided a trap-type live wire terminal insulation cap and an indirect live wire insulation method for a jumper wire using the trap-type live wire terminal insulation cap capable of safely, easily, and firmly fixing a terminal that is a charging part of a new electric wire or a cut electric wire by only inserting the terminal into the trap-type live wire terminal insulation cap, the trap-type live wire terminal insulation cap being configured to form a trap such that a fixing force is more strongly generated when the new electric wire or the cut electric wire is pulled in a direction in which the electric wire is separated, thereby being capable of safely protecting the terminal of the electric wire. Furthermore, in the trap-type live wire terminal insulation cap, the electric wire is capable of being fixed or released by a simple operation in which an operation head is held and moved by using an insulation stick for an indirect live wire, so that indirect live wire insulation work is capable of being safely and easily performed. Furthermore, in the trap-type live wire terminal insulation cap, since a jumper wire supporting member is installed on an electric wire having tension or a suspension insulator and the trap-type live wire terminal insulation cap is coupled to the jumper wire supporting member, the new electric wire or the cut electric wire is stably protected at a predetermined position, thereby being capable of increasing safety and efficiency of work.

Technical Solution

In order to achieve the objectives as described above, in the present disclosure, there is provided a trap-type live wire terminal insulation cap including: a base body 100 into which a terminal of a jumper wire W is inserted, the base body 100 having a front side of an outer circumference provided with a plurality of operation holes 112 formed therethrough; a plurality of gripping members 200 having front sides thereof hinge-coupled to the operation holes 112 of the base body 100, the gripping members 200 having respective links 210 that protrude on front side upper portions of the gripping members 200; an operation head 300 slidably coupled to the front side of the outer circumference of the base body 100 such that the operation head 300 is elastically supported rearward, the operation head 300 which has a front surface provided with respective operation grooves 310 corresponding to the operation holes 112 and to which the links 210 of the gripping members 200 are hinge-coupled to the operation grooves 310; and a hanger-type jumper wire supporting member 400 having an upper portion coupled to an electric wire L having tension or to a suspension insulator and having a lower portion to which a rear side of the base body 100 is coupled.

In order to achieve the objectives as described above, in the present disclosure, there is provided a trap-type live wire terminal insulation cap including: a base body 100 into which a terminal of a jumper wire W is inserted, the base body 100 having a front side of an outer circumference provided with a plurality of operation holes 112 formed therethrough; a plurality of gripping members 200 having front sides thereof hinge-coupled to the operation holes 112 of the base body 100, the gripping members 200 having respective links 210 that protrude on front side upper portions of the gripping members 200; an operation head 300 slidably coupled to the front side of the outer circumference of the base body 100 such that the operation head 300 is elastically supported rearward, the operation head 300 which has a front surface provided with respective operation grooves 310 corresponding to the operation holes 112 and to which the links 210 of the gripping members 200 are hinge-coupled to the operation grooves 310; and a crossarm-type jumper wire supporting member 500 having an upper portion coupled to a crossarm S and to which a rear side of the base body 100 is coupled to at least one of both sides of the crossarm-type jumper wire supporting member 500.

In addition, the base body 100 may include: a rear body 110 into which the terminal of the jumper wire W is inserted and which has a front side of an outer circumference provided with the plurality of operation holes 112 formed therethrough; and a front body 120 into which a front side of the rear body 110 is inserted and coupled, the front body 120 having a rear surface provided with a plurality of installation grooves 122 so as to be positioned outside the rear body 110, and the front body 120 being provided with respective elastic members 124 installed in the installation grooves 122, wherein the operation head 300 may include an elastic supporting part 320 which protrudes on an outer circumference of the operation head 300 and which supports rear sides of the elastic members 124.

In addition, the gripping members 200 may include respective teeth parts 220 formed on rear lower surfaces of the gripping members 200, and the teeth parts 220 may be formed in curved shapes.

In addition, the hanger-type jumper wire supporting member 400 may include: a coupling ring 410 having an upper portion hung and coupled to the electric wire L having tension or to the suspension insulator; and an insulation rope 420 having an upper portion coupled to a lower portion of the coupling ring 410 and having a lower portion coupled to the rear side of the base body 100.

In addition, the coupling ring 410 may include: a first hook 412 having an upper inner side provided with a first hanging groove into which the electric wire L having tension or the suspension insulator is capable of being inserted and hung, the first hook 412 having a first side surface provided with a rail groove 412a formed in an arc shape and having an upper rear side opened; a separation prevention lever 414 having an upper terminal opened such that a second hanging groove corresponding to the first hanging groove of the first hook 412 is formed, the separation prevention lever 414 having an upper portion formed in a shape corresponding to a shape of the rail groove 412a of the first hook 412 and coupled to the rail groove 412a such that the separation prevention lever 414 is capable of being rotated along the rail groove 412a, and the separation prevention lever 414 having a lower portion that protrudes toward the opened upper rear side of the first hook 412; and a second hook 416 having a third hanging groove corresponding to the first hanging groove of the first hook 412, the second hook 416 being coupled to the first side surface of the first hook 412 and closing a first side of the rail groove 412a of the first hook 412 and a first side of the opened upper rear side of the first hook 412.

In addition, the crossarm-type jumper wire supporting member 500 may include: a base frame 510 having a length in a vertical direction; a fixing part 520 coupled to an upper portion of the base frame 510 and installed on the crossarm S; and a position adjustment part 530 slidably coupled to the base frame 510 and coupled to the base frame 510 such that the rear side of the base body 100 is capable of being rotated.

In addition, the fixing part 520 may include a coupling part 521 having a front side opened, the coupling part 521 being formed on an upper portion and a lower portion of the fixing part 520 so as to be coupled to the upper portion of the base frame 510.

In addition, the fixing part 520 may include: a lower supporting member 522 hinge-coupled to a rear side of the fixing part 520; and a first tightening device 523 hinge-coupled to a rear lower portion of the fixing part 520, the first tightening device 523 having an upper portion hinge-coupled to a rear side of the lower supporting member 522 and being configured to move the lower supporting member 522 up and down.

In addition, the fixing part 520 may include a square crossarm fixing member 524 having an upper portion coupled to an inner upper portion of the fixing part 520.

In addition, the position adjustment part 530 may include: a moving body 531 slidably coupled to the base frame 510; a locking part 532 installed on a rear side of the moving body 531 and configured to fix or release a sliding movement of the moving body 531; and a coupling protrusion 533 that protrudes on a front surface of the moving body 531, the coupling protrusion 533 being coupled such that the rear side of the base body 100 is capable of being rotated.

In addition, the coupling protrusion 533 may include a pair of coupling protrusions 533 that protrudes from both sides of a rear surface of the moving body 531.

In addition, the position adjustment part 530 may include: an upper wire fixing member 534 having an upper portion of a rear surface thereof coupled to an upper portion of a front surface of the moving body 531 such that the upper wire fixing member 534 is capable of being rotated, the upper wire fixing member 534 having a front side of a lower surface provided with an upper accommodating groove 534a in which the jumper wire W is capable of being accommodated; a second tightening device 535 having an upper portion which penetrates a rear side of the lower surface of the upper wire fixing member 534 and which is screw-coupled to the upper wire fixing member 534; and a lower wire fixing member 536 having a rear side through which the second tightening device 535 penetrates and to which the second tightening device 535 is screw-coupled, the lower wire fixing member 536 being installed spaced apart from a lower portion of the upper wire fixing member 534, and the lower wire fixing member 536 having a front side of an upper surface provided with a lower accommodating groove 536a in which the jumper wire W is capable of being accommodated.

In addition, the position adjustment part 530 may include: a rotation adjustment part 537 which protrudes on a lower portion of the front surface of the moving body 531 and in which a penetration hole 537a is formed in the vertical direction; and a rotation fixing member 538 which is inserted into and coupled to a lower portion of the penetration hole 537a of the rotation adjustment part 537 and which is provided with a locking member 538a configured to be moved upward and downward along the penetration hole 537a, wherein the upper wire fixing member 534 may include an angle adjustment groove 534d including a plurality of angle adjustment grooves 534d formed in the rear side of the lower surface of the upper wire fixing member 534 in left and right directions, the angle adjustment grooves 534d being configured such that the locking member 538a of the rotation fixing member 538 is capable of being inserted and pulled.

In addition, in order to achieve the objectives as described above, in the present disclosure, there is provided an indirect live wire insulation method for a jumper wire, the method using a trap-type live wire terminal insulation cap C, and the method including: a first preparation process S10 in which the hanger-type jumper wire supporting member 400 or the crossarm-type jumper wire supporting member 500 is installed around the jumper wire W that requires work; a second preparation process S20 in which a rear side of the trap-type live wire terminal insulation cap C is coupled to the hanger-type jumper wire supporting member 400 or the crossarm-type jumper wire supporting member 500; a cutting process S30 in which the jumper wire W that requires work is cut; and a fastening process S40 in which a terminal of the jumper wire W that is cut is inserted into and fixed to the trap-type live wire terminal insulation cap C.

Advantageous Effects

In the trap-type live wire terminal insulation cap and the indirect live wire insulation method for the jumper wire using the trap-type live wire terminal insulation cap according to the present disclosure, when the cut jumper wire, i.e., the electric wire, is inserted into the base body, the plurality of gripping members maintaining the trap that is operated only in one direction is splayed, so that the electric wire is capable of being easily inserted into the base body. Furthermore, by the operation head installed on the base body such that the operation head is elastically supported rearward, the plurality of gripping members maintains the trap that is operated only in one direction after the electric wire is inserted into the base body, and the plurality of gripping members more firmly fixes the electric wire when the electric wire is moved in a direction in which the electric wire is separated, so that the new electric wire or the cut electric wire (the jumper wire) is capable of being easily fixed by only performing a simple electric wire insertion operation. Furthermore, there is an effect that the terminal of the new electric wire or the cut jumper wire, i.e., the charging part is capable of being wrapped, insulated, and protected safely and firmly.

In addition, by using the hanger-type jumper wire supporting member which is installed on an electric wire having tension or an suspension insulator and to which the rear side of the base body is capable of being coupled or by using the crossarm-type jumper wire supporting member which is installed on a crossarm and to which the rear side of the base body is capable of being coupled, the new electric wire or the cut jumper wire is capable of being stably and firmly fixed to a predetermined position, so that there are effects that accidents caused by high voltage current during indirect live wire work may be prevented and work efficiency may be increased by reducing labor intensity and fatigue according to physical limits of a worker.

DESCRIPTION OF DRAWINGS

FIGS. 14A and 14B show side views illustrating the crossarm-type jumper wire supporting member according to an exemplary embodiment of the present disclosure.

FIGS. 16A and 16B show side views illustrating the crossarm-type jumper wire supporting member according to an exemplary embodiment of the present disclosure, in which an upper portion of a fixing part is coupled to a base frame.

DETAILED EXPLANATION OF THE MAIN SYMBOLS IN THE DRAWINGS

Figure 1:
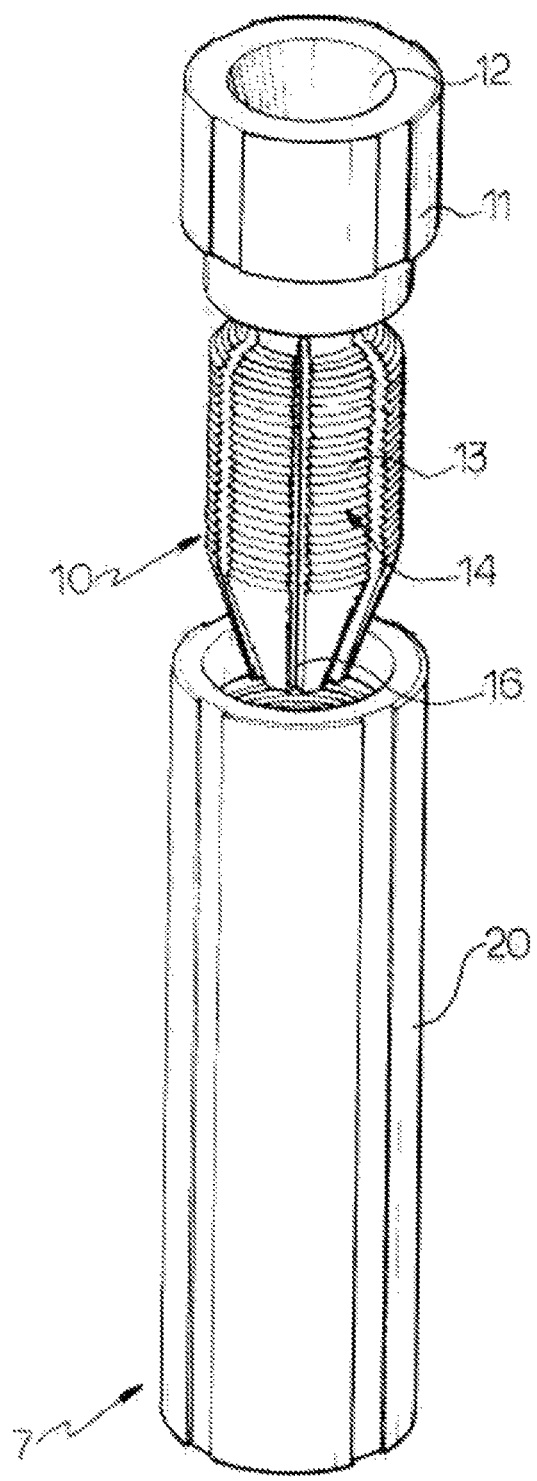
FIG. 1 is a perspective view illustrating a conventional insulation cap.
Figure 2:
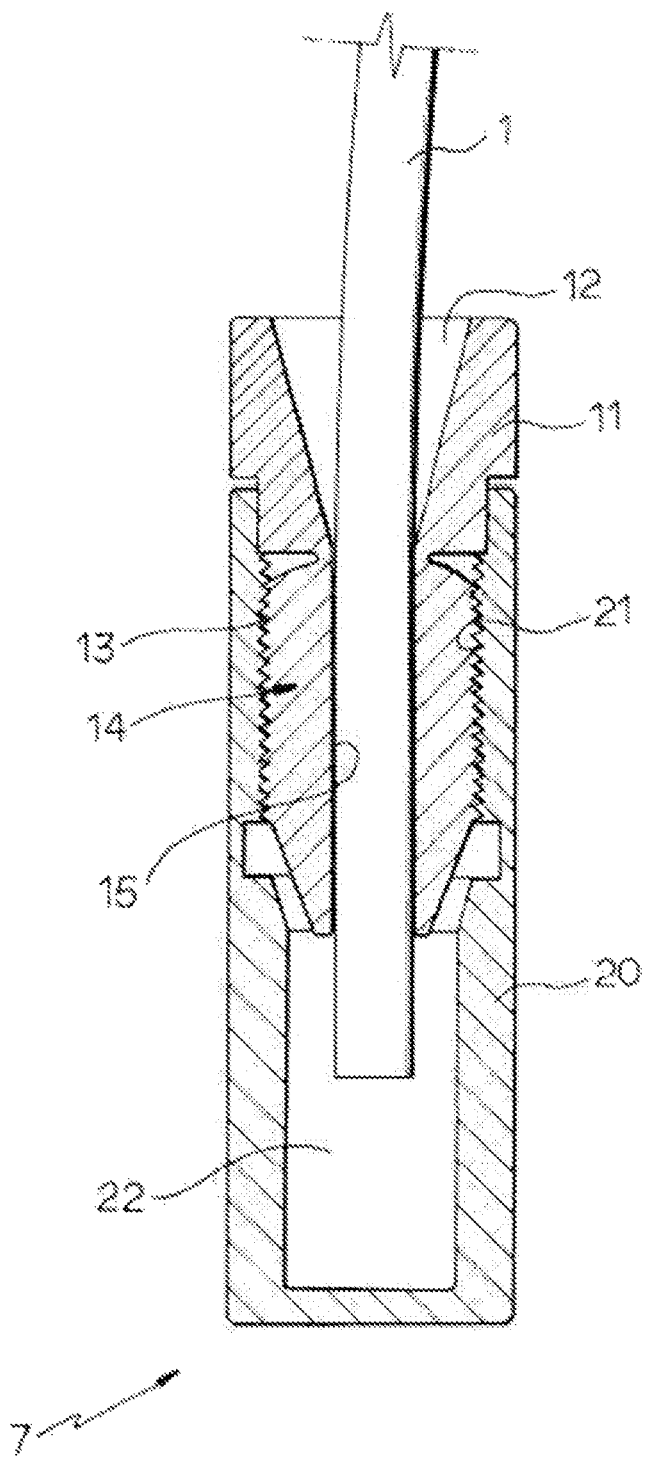
FIG. 2 is a cross-sectional view illustrating a state of use of the conventional insulation cap.
Figure 3:
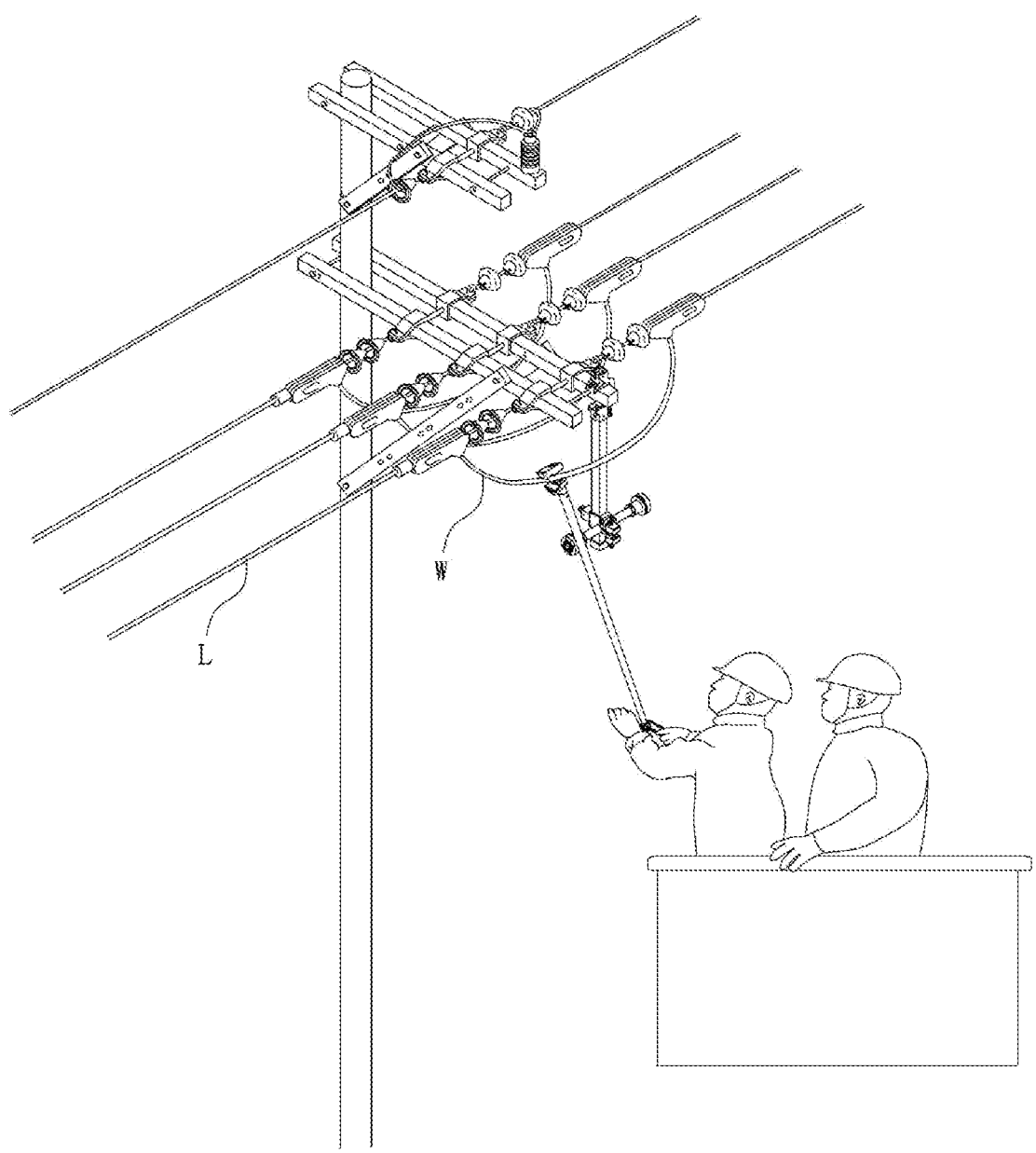
FIG. 3 is a schematic view illustrating an actual work state of an indirect live wire insulation method for a jumper wire using a trap-type live wire terminal insulation cap according to an exemplary embodiment of the present disclosure.
Figure 4:
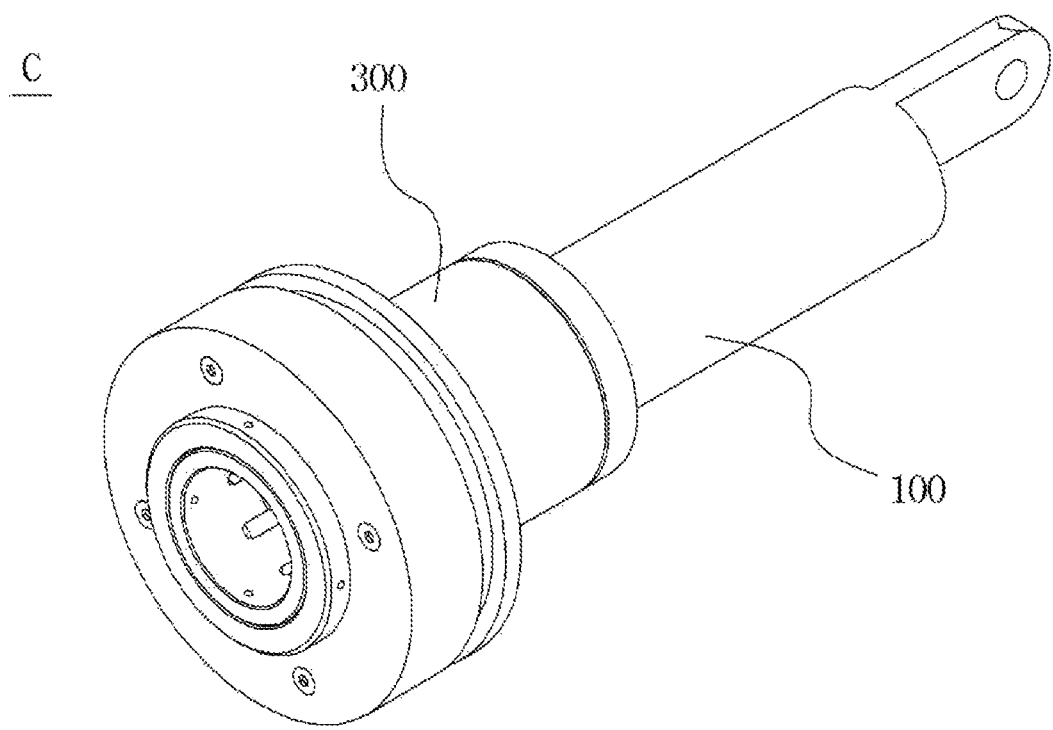
FIG. 4 is a perspective view illustrating the trap-type live wire terminal insulation cap according to an exemplary embodiment of the present disclosure.
Figure 5A:
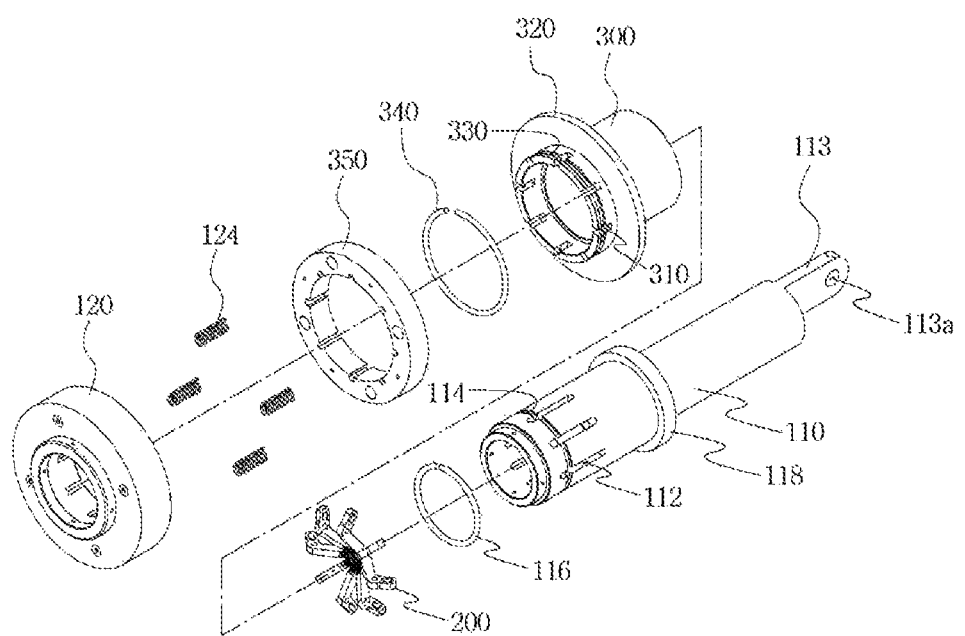
FIGS. 5A and 5B show exploded perspective views illustrating the trap-type live wire terminal insulation cap according to an exemplary embodiment of the present disclosure.
Figure 5B:
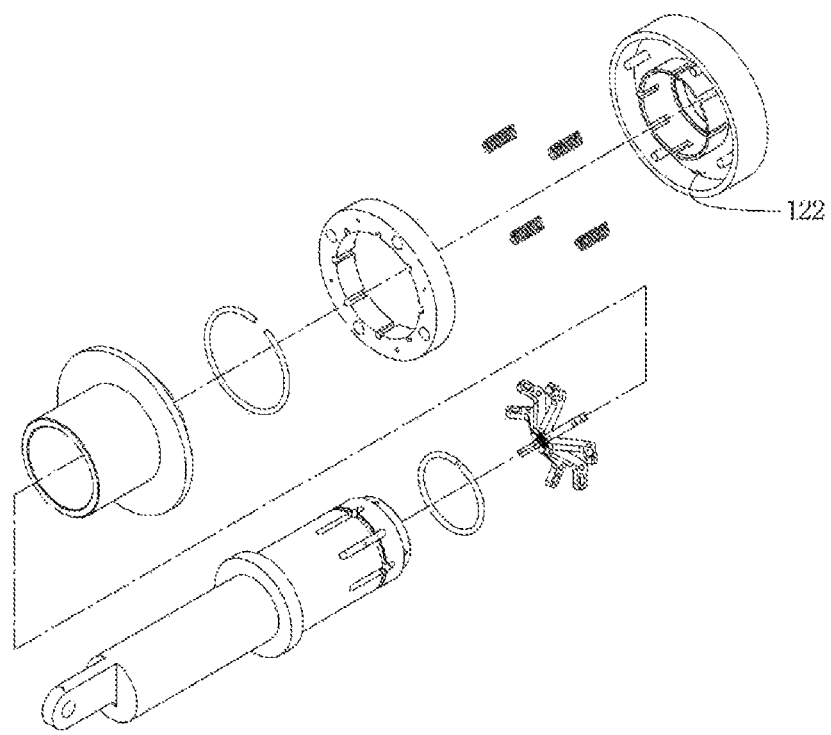
Figure 6A:
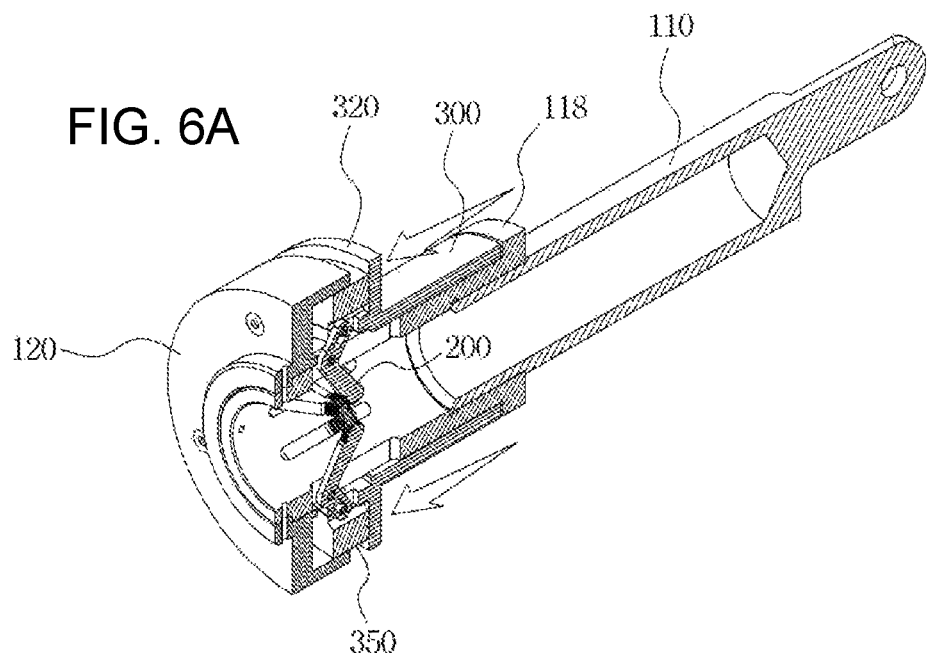
FIGS. 6A and 6B show cross-sectional perspective views illustrating a state before operating and a state after operating the trap-type live wire terminal insulation cap according to an exemplary embodiment of the present disclosure.
Figure 6B:
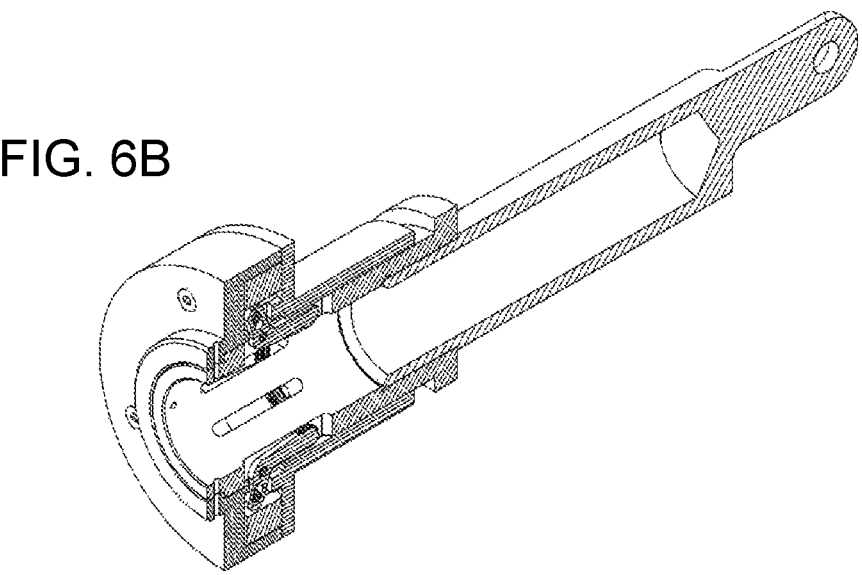
Figure 7:
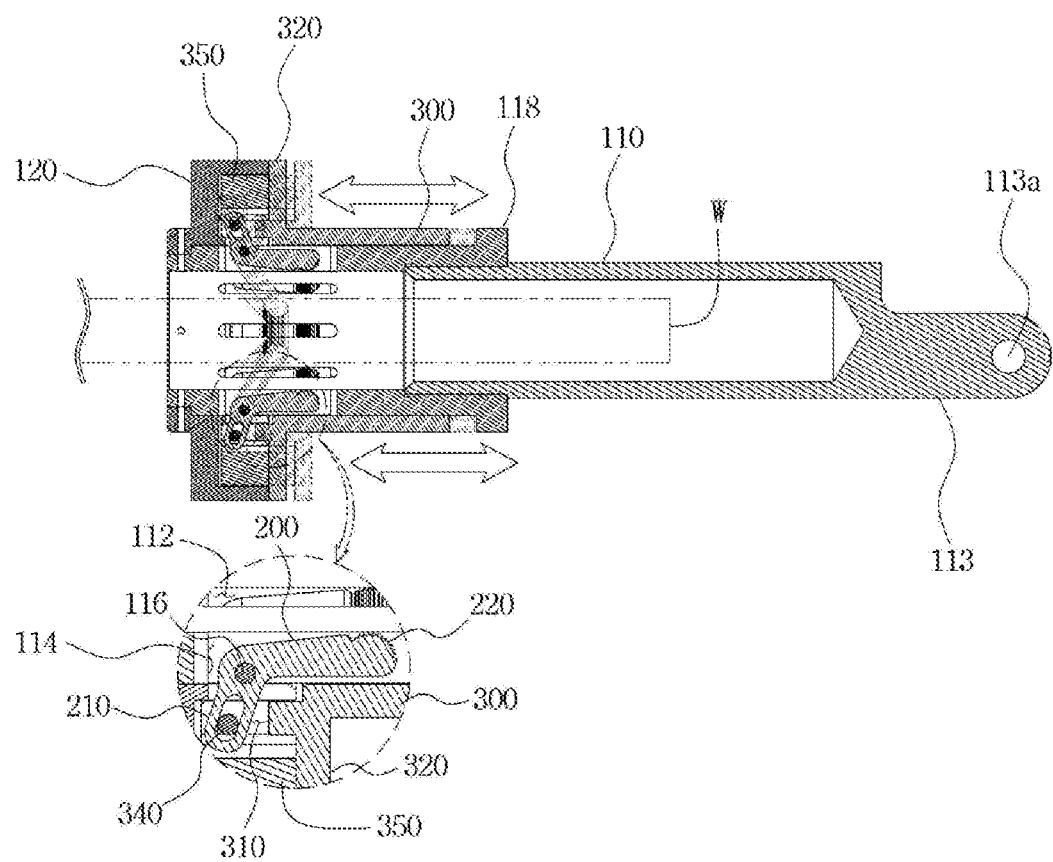
FIG. 7 is a side cross-sectional view illustrating the operation of the trap-type live wire terminal insulation cap according to an exemplary embodiment of the present disclosure.
Figure 8:
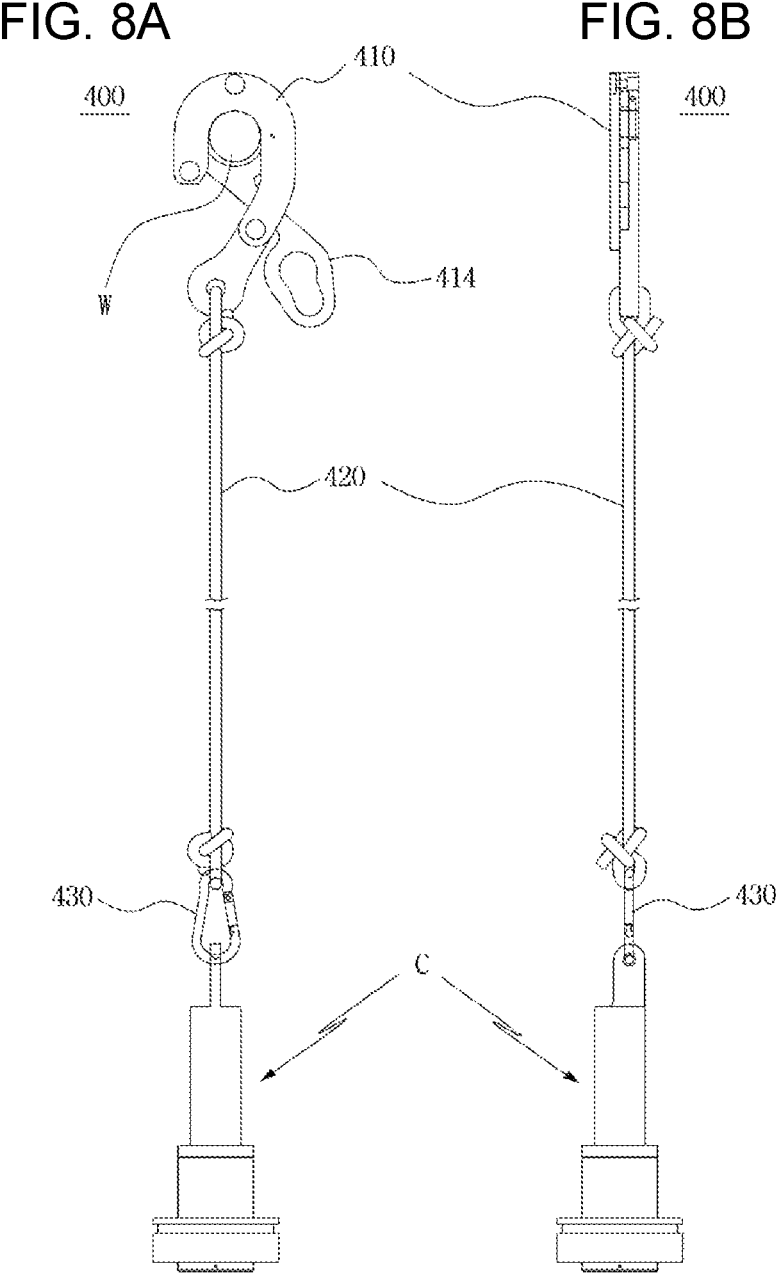
FIGS. 8A and 8B show a front view and a side view illustrating a hanger-type jumper wire supporting member to which the trap-type live wire terminal insulation cap according to an exemplary embodiment of the present disclosure is coupled.
Figure 9:
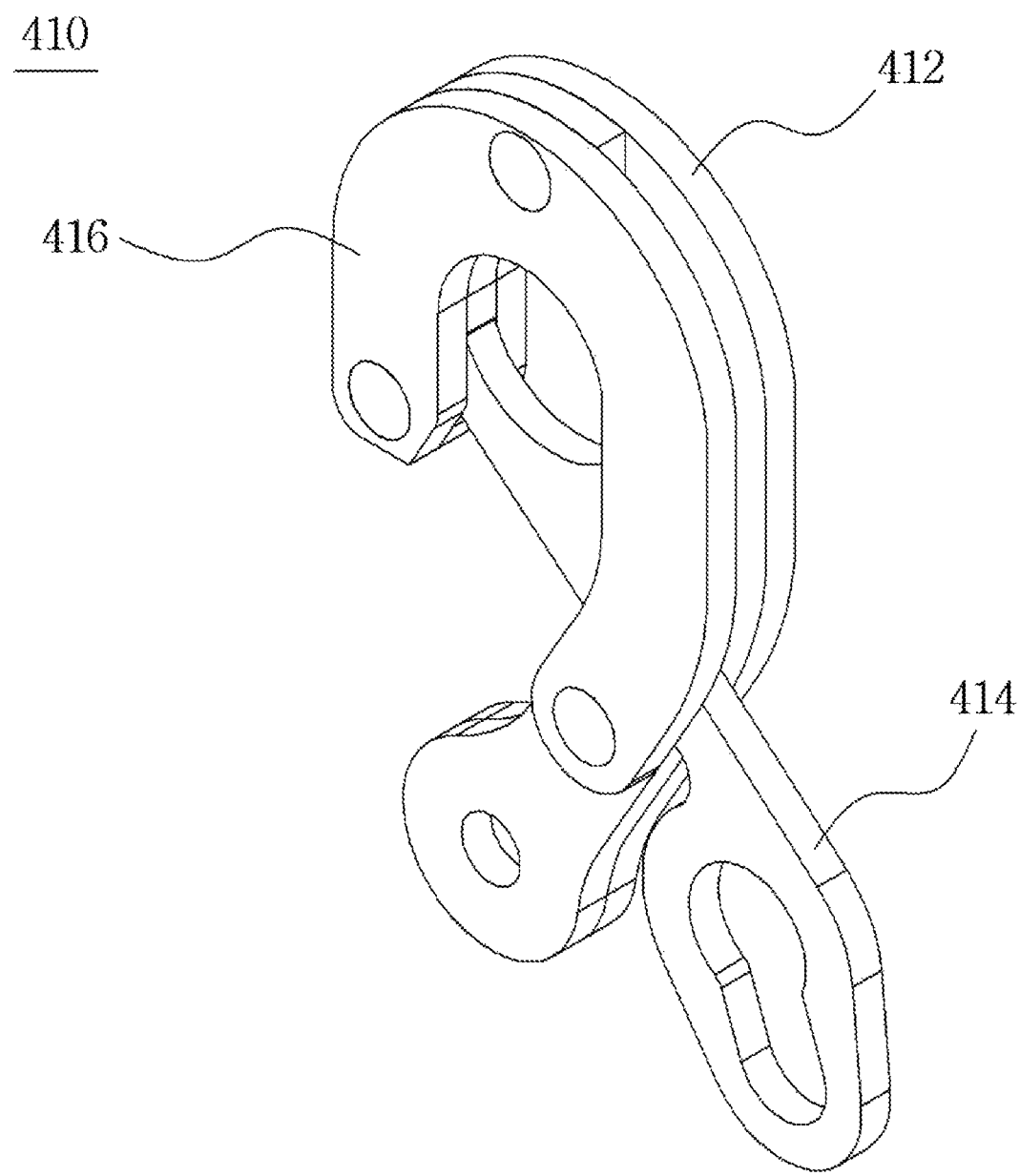
FIG. 9 is a perspective view illustrating a coupling ring.
Figure 10:
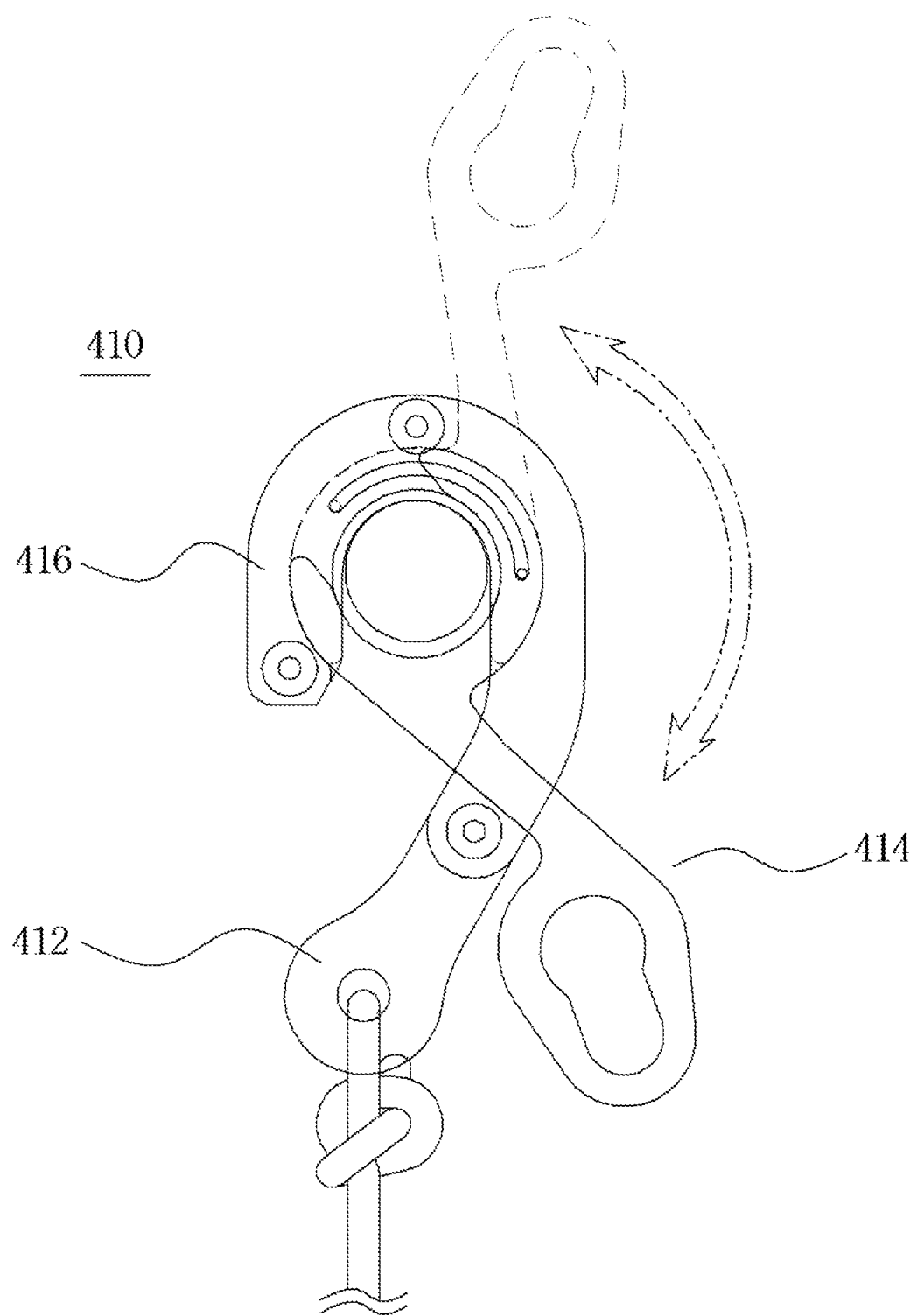
FIG. 10 is a projection side view illustrating an operation of the coupling ring.
Figure 11A:
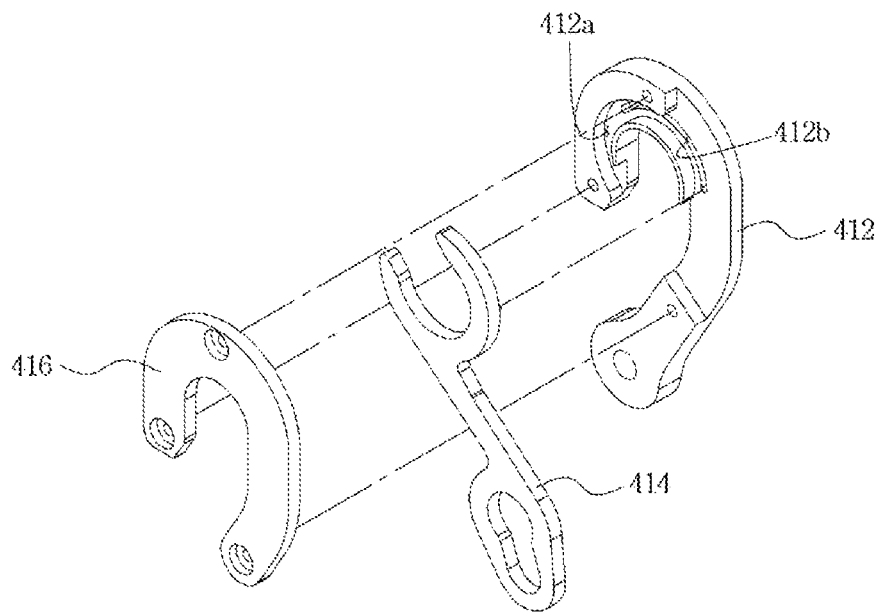
FIG. 11A shows an exploded perspective view illustrating the coupling ring.
Figure 11B:
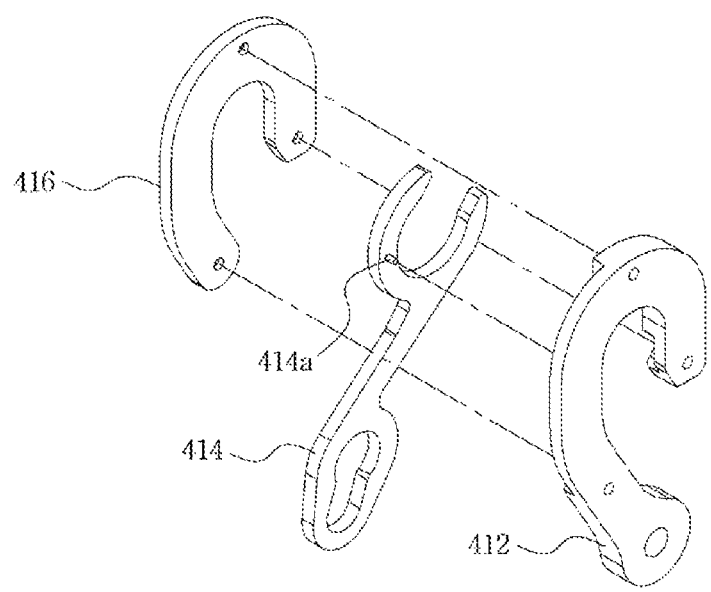
FIG. 11B shows an exploded perspective view in a different angle illustrating the coupling ring.
Figure 12:
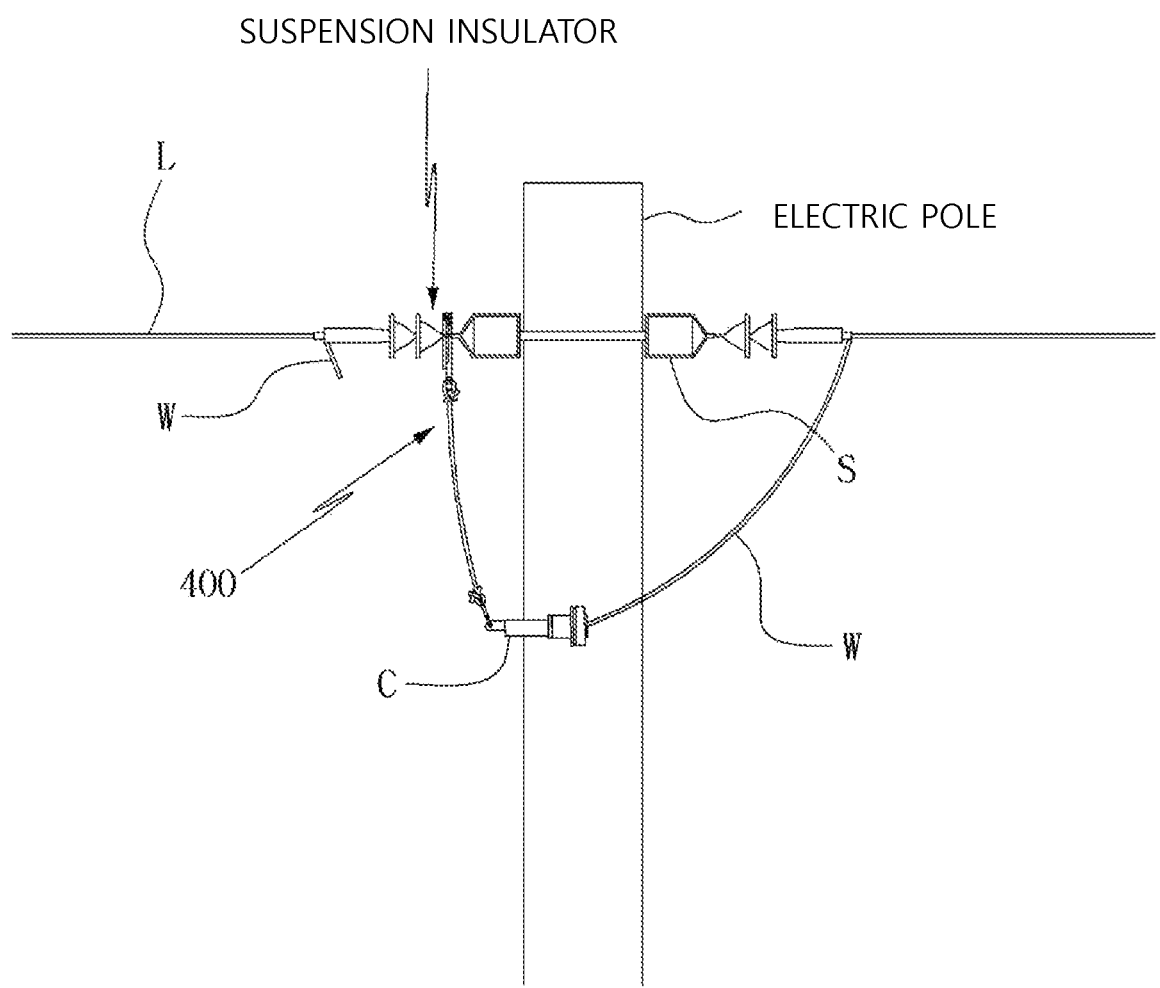
FIG. 12 is a schematic view illustrating a fastening process of the indirect live wire insulation method for the jumper wire using the trap-type live wire terminal insulation cap, in which fixing of a cut jumper wire by using the hanger-type jumper wire supporting member coupled to the trap-type live wire terminal insulation cap according to an exemplary embodiment of the present disclosure is illustrated.
Figures 13A, 13B:
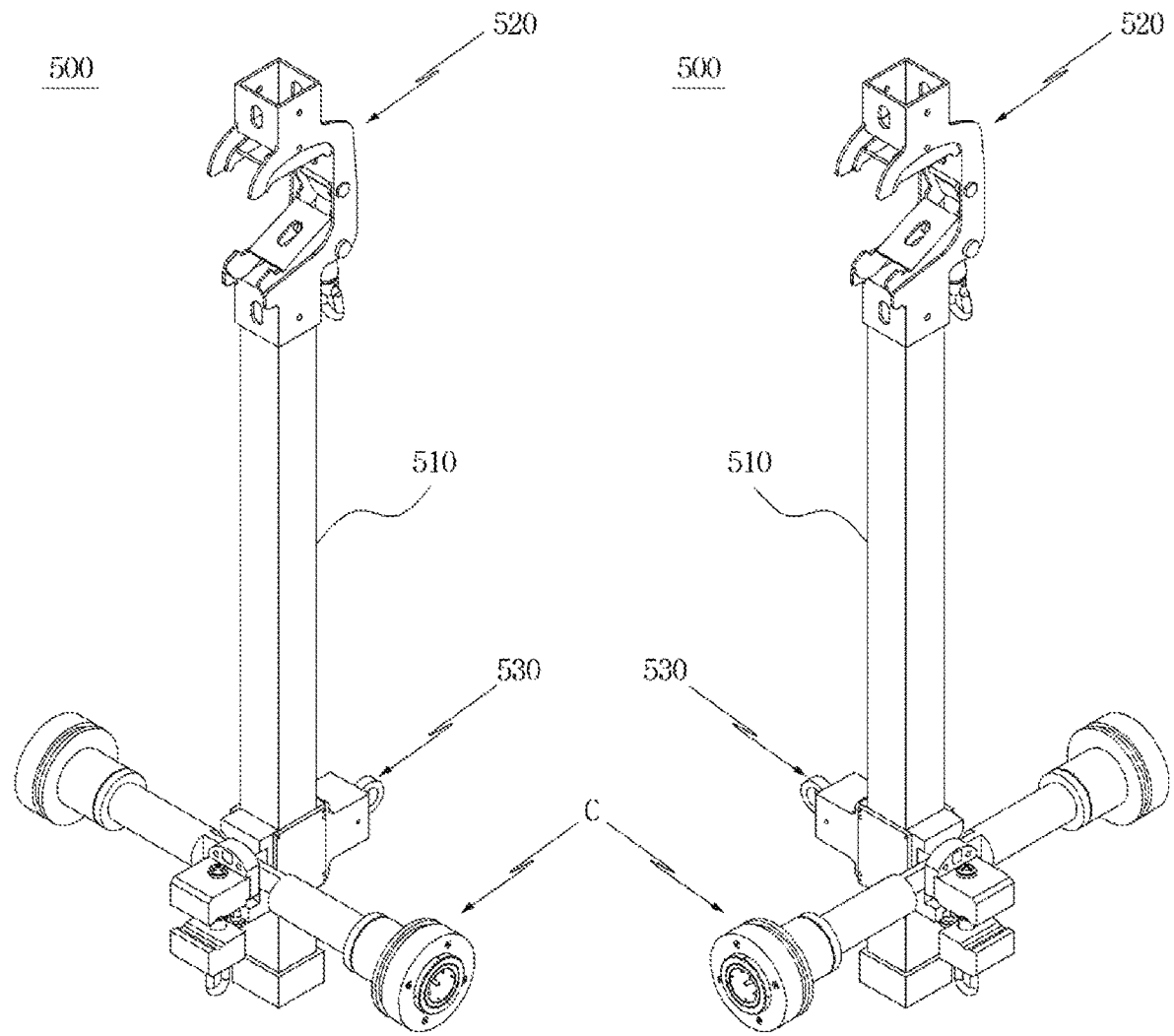
FIGS. 13A and 13B show perspective views illustrating a crossarm-type jumper wire supporting member to which the trap-type live wire terminal insulation cap according to an exemplary embodiment of the present disclosure is coupled.
Figure 15:
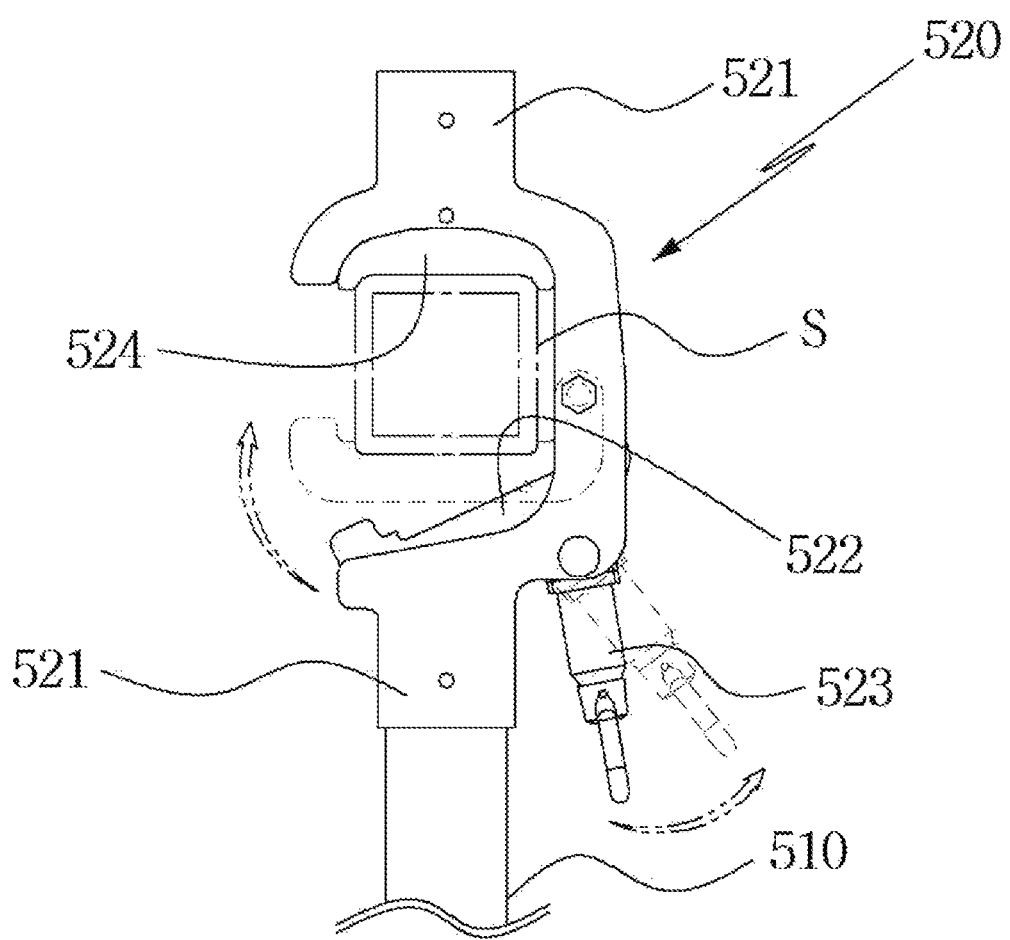
FIG. 15 is a partial side view illustrating the crossarm-type jumper wire supporting member according to an exemplary embodiment of the present disclosure.
Figure 17A:
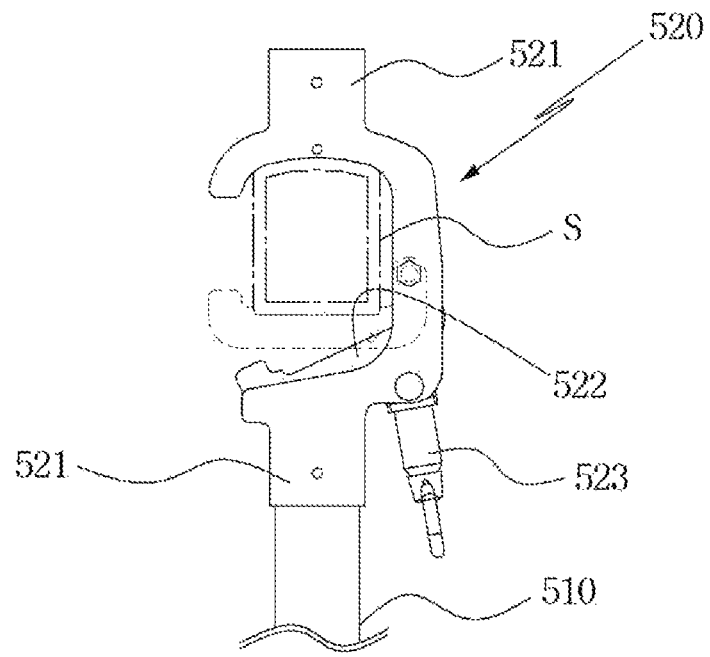
FIG. 17A shows a partial side view illustrating the crossarm-type jumper wire supporting member to which a square crossarm fixing member according to an exemplary embodiment of the present disclosure is not coupled.
Figure 17B:
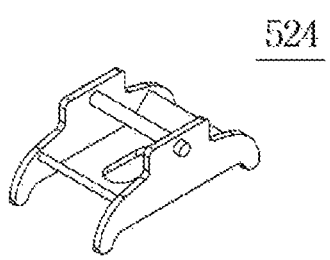
FIG. 17B shows a perspective view illustrating the square crossarm fixing member.
Figure 18:
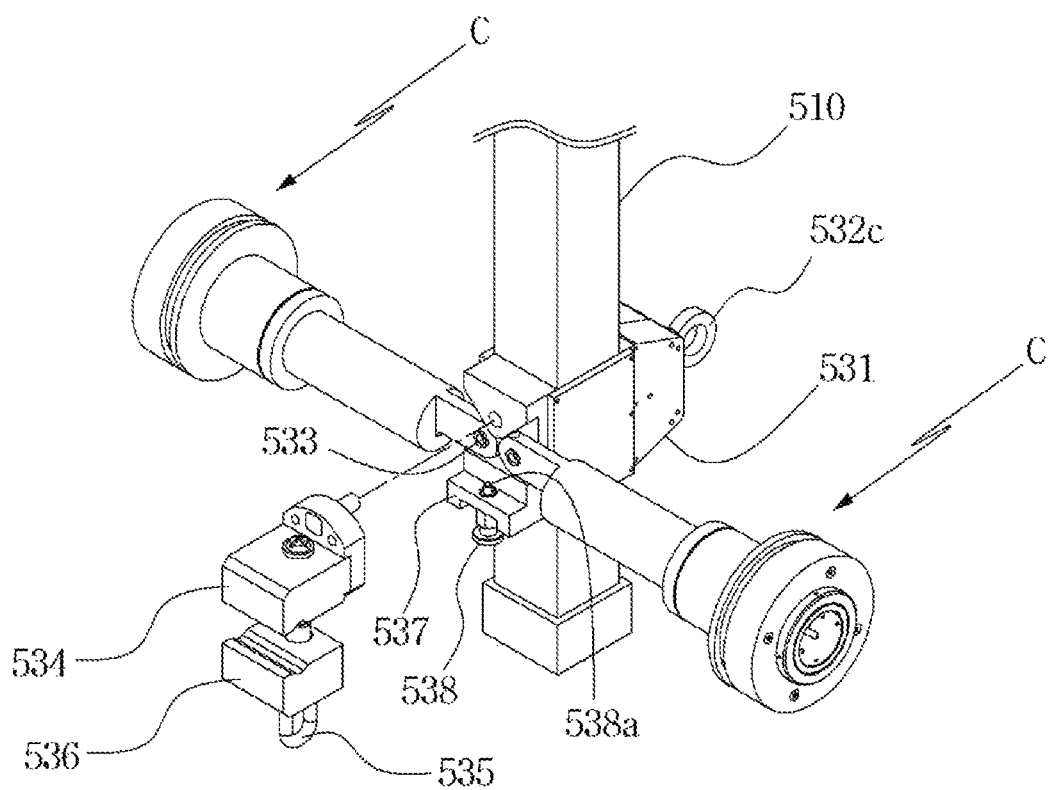
FIG. 18 is a partial exploded perspective view illustrating a position adjustment part according to an exemplary embodiment of the present disclosure.
Figure 19:
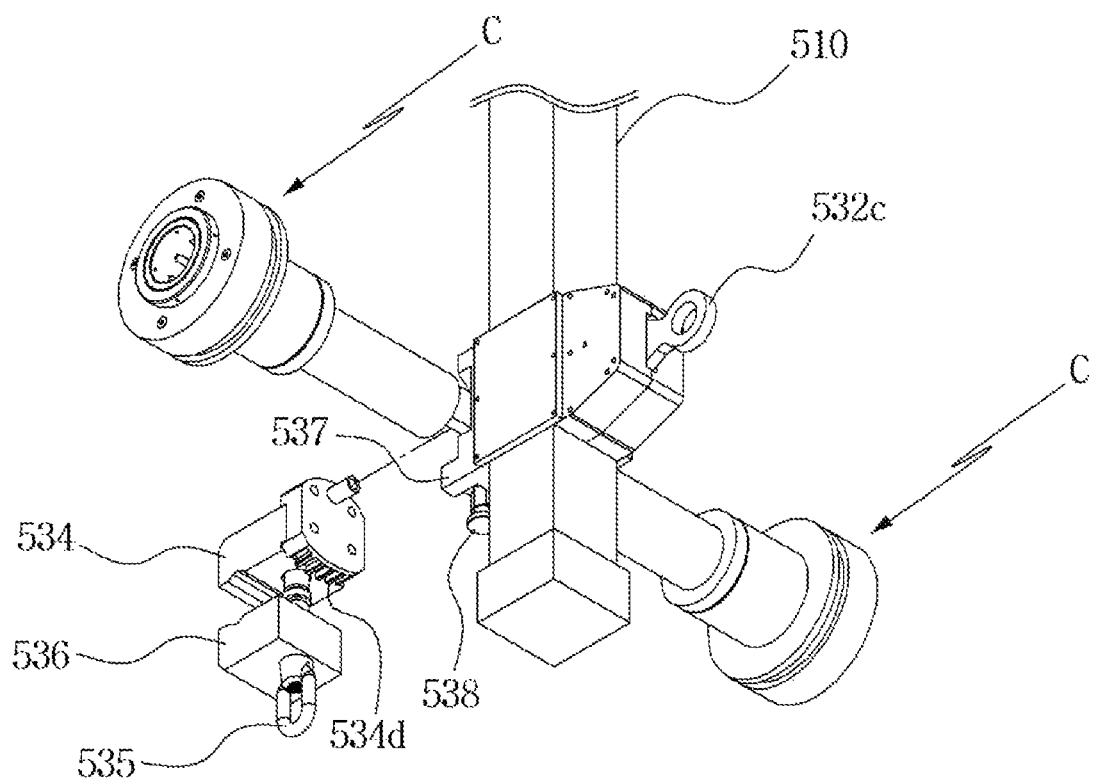
FIG. 19 is a bottom perspective view of FIG. 15 in a different angle.
Figures 20A, 20B:
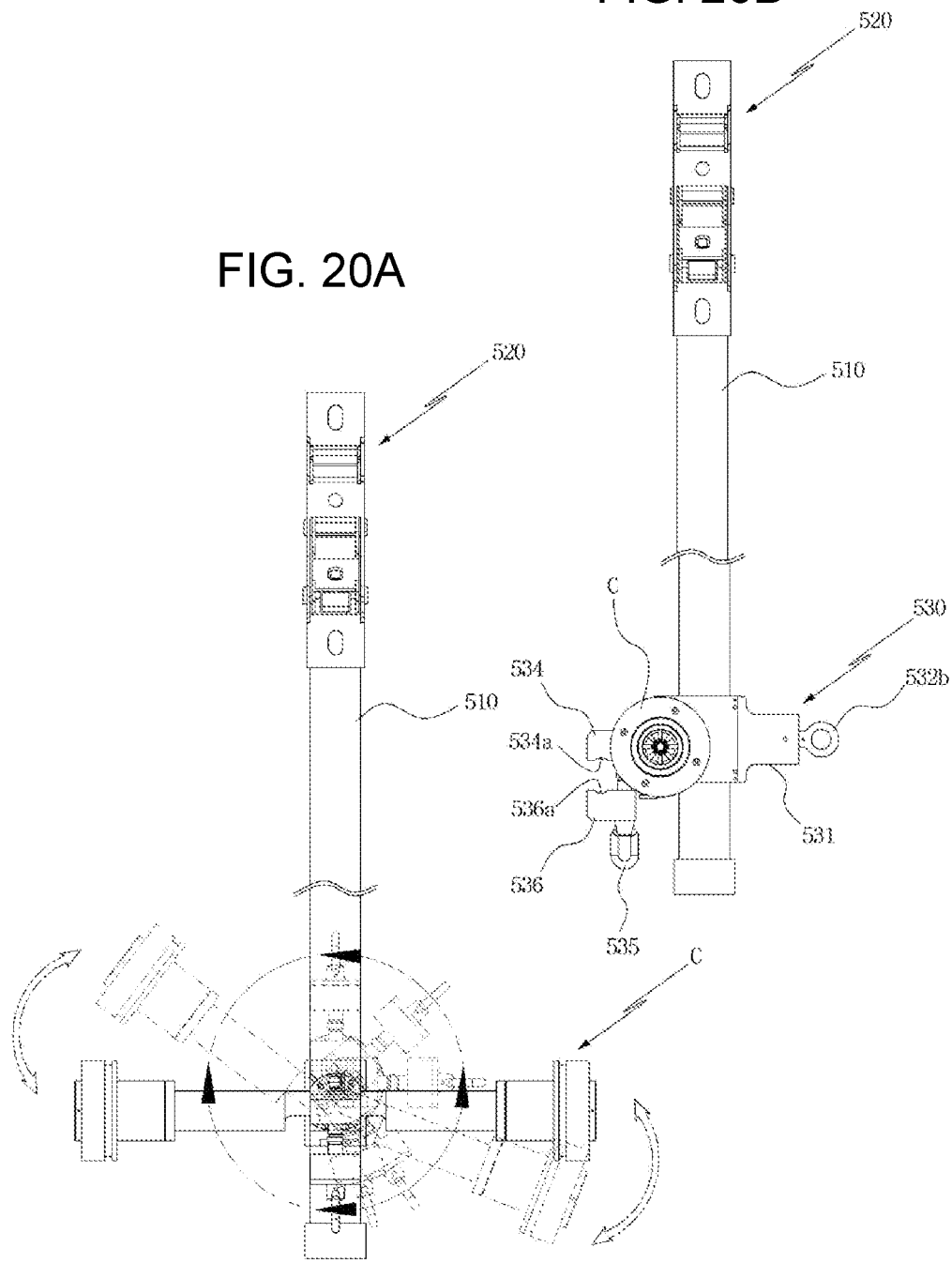
FIGS. 20A and 20B show front views of the crossarm-type jumper wire supporting member in which a rotation of the trap-type live wire terminal insulation cap and a rotation of an electric wire fixing member according to an exemplary embodiment of the present disclosure are illustrated.
Figure 21:
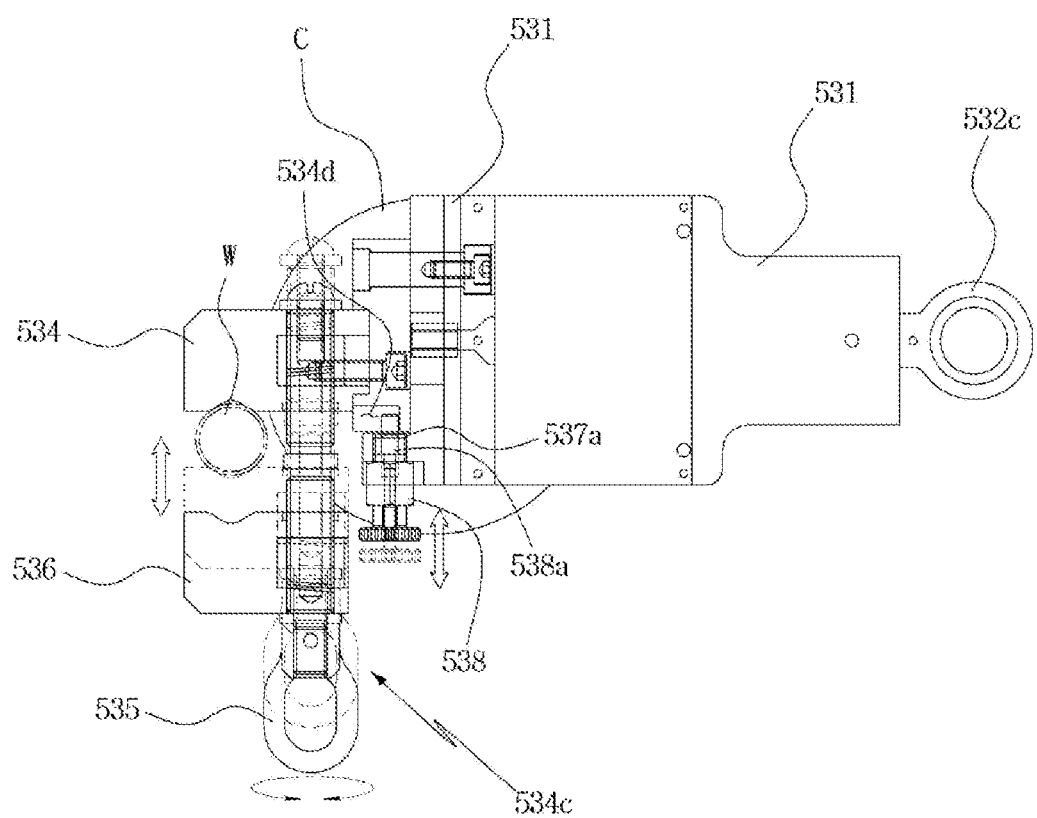
FIG. 21 is a partial side cross-sectional view of the position adjustment part in which an operation of the electric wire fixing member according to an exemplary embodiment of the present disclosure is illustrated.
Figure 22:
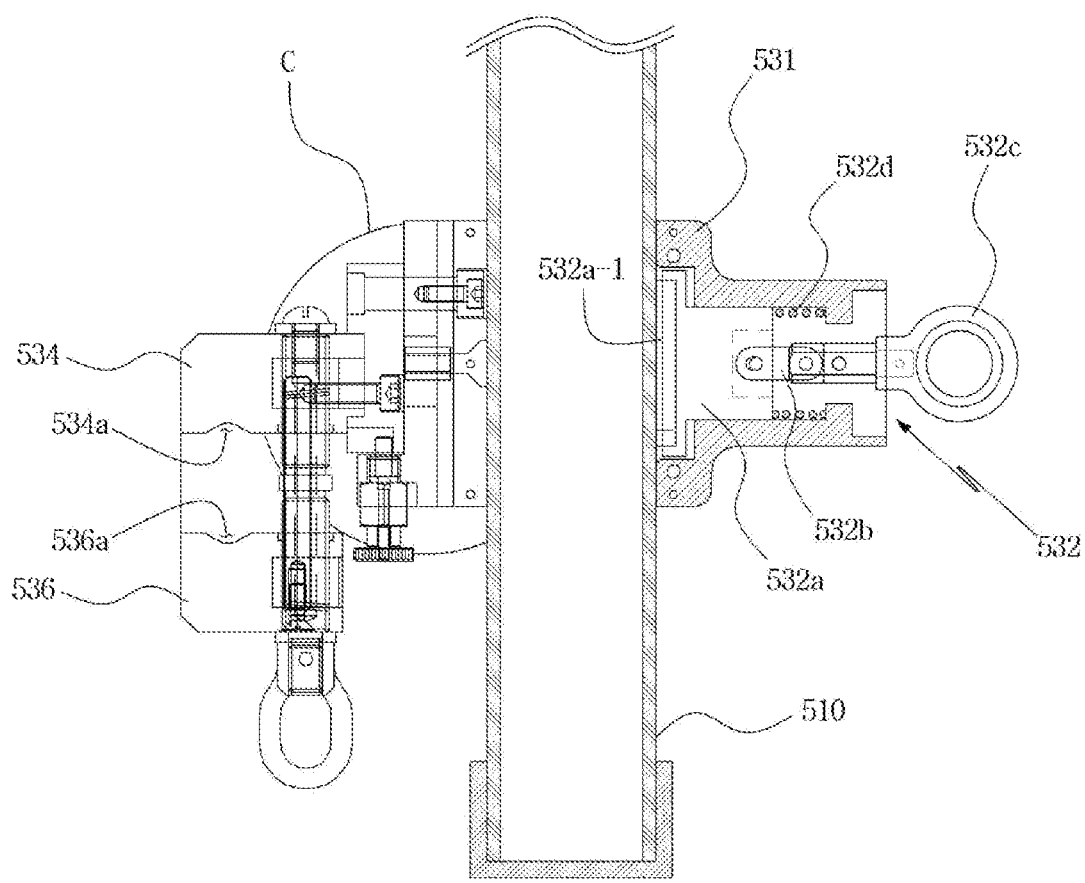
FIG. 22 is a partial side cross-sectional view of the crossarm-type jumper wire supporting member in which the position adjustment part according to an exemplary embodiment of the present disclosure is illustrated.
Figure 23:
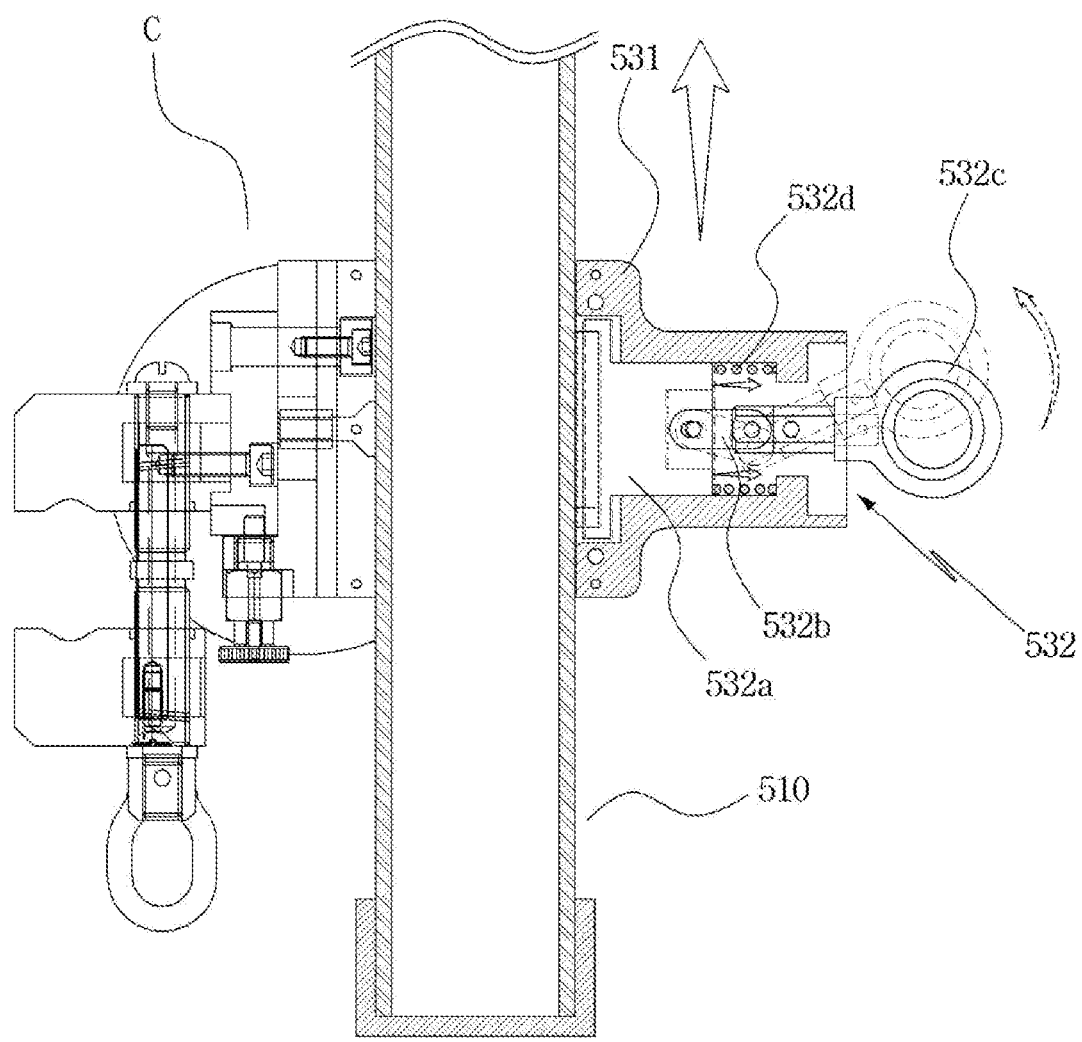
FIG. 23 is a partial side cross-sectional view of the crossarm-type jumper wire supporting member in which an upward movement of the position adjustment part according to an exemplary embodiment of the present disclosure is illustrated.
Figure 24:
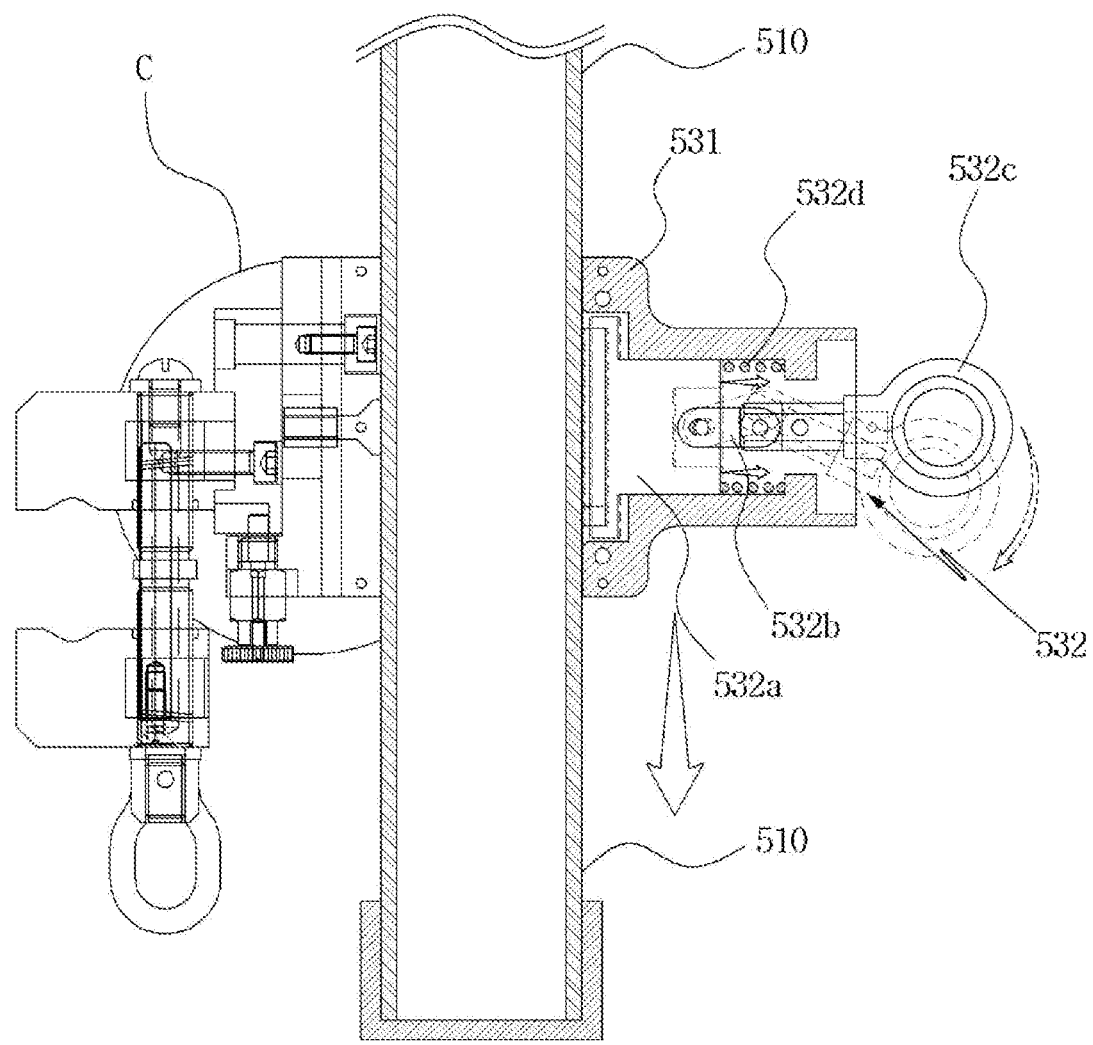
FIG. 24 is a partial side cross-sectional view of the crossarm-type jumper wire supporting member in which a downward movement of the position adjustment part according to an exemplary embodiment of the present disclosure is illustrated.
Figure 25:
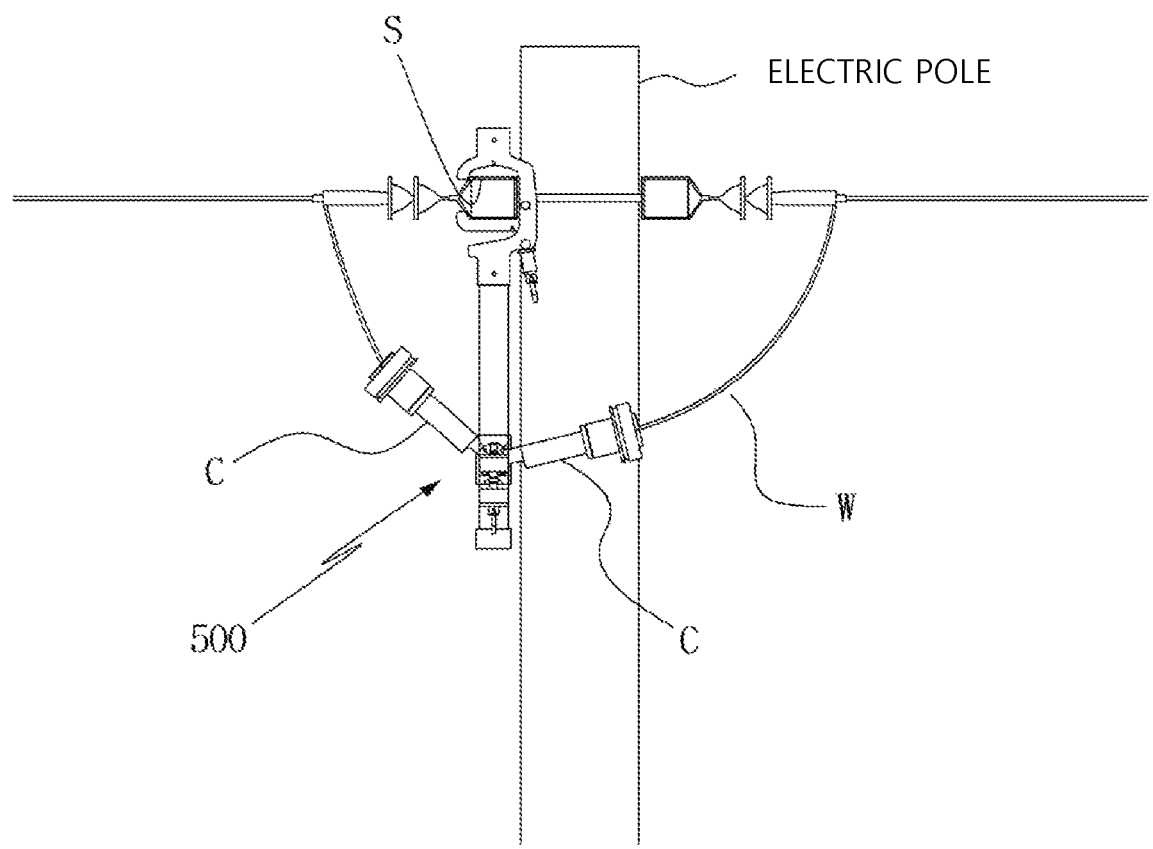
FIG. 25 is a schematic view illustrating a fastening process of the indirect live wire insulation method for the jumper wire using the trap-type live wire terminal insulation cap, in which fixing of the cut jumper wire by using the crossarm-type jumper wire supporting member coupled to the trap-type live wire terminal insulation cap according to an exemplary embodiment of the present disclosure is illustrated.
Figure 26:
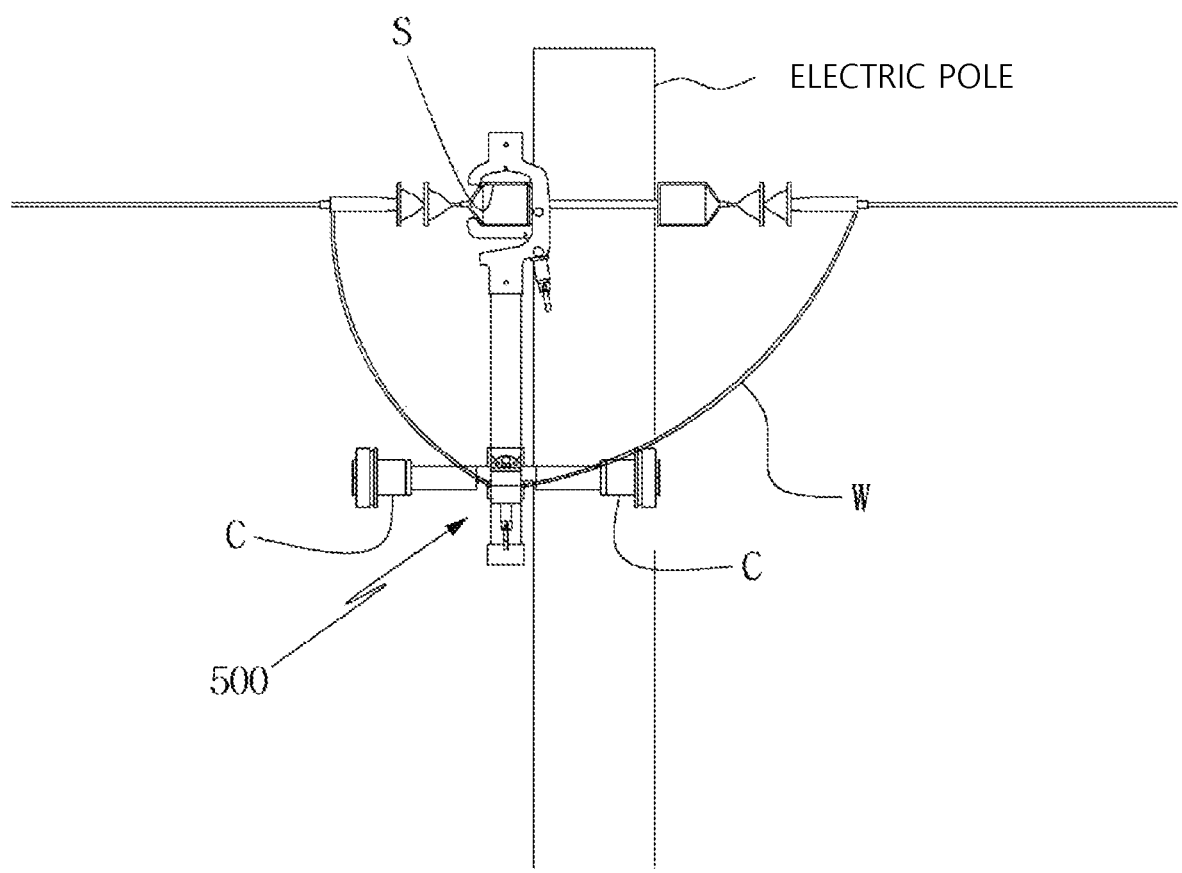
FIG. 26 is a schematic view illustrating a preparation process of the indirect live wire insulation method for the jumper wire using the trap-type live wire terminal insulation cap, in which fixing of the jumper wire that is not cut by using the crossarm-type jumper wire supporting member according to an exemplary embodiment of the present disclosure is illustrated.

C: trap-type live wire terminal insulation cap
S: crossarm
W: jumper wire
L: electric wire (referred to as an electric wire other than a jumper wire)
100: base body
110: rear body 112: operation hole
120: front body 122: installation groove
124: elastic member
200: gripping member
210: link 220: teeth part
300: operation head
310: operation groove 320: elastic supporting part
400: hanger-type jumper wire supporting member
410: coupling ring 412: first hook
412a: rail groove 412b: first auxiliary rail groove
414: separation prevention lever 414a: auxiliary protrusion 416: second hook 420: insulation rope
500: crossarm-type jumper wire supporting member
510: base frame 520: fixing part
520a: wire tensioner ring 520b: wire tensioner coupling hole
521: coupling part 522: lower supporting member
523: first tightening device 524: square crossarm fixing member
530: position adjustment part 531: moving body
532: locking part 532a: fixing block
532b: link bar 532c: adjustment ring
532d: pressing elastic member 532a-1: packing
533: coupling protrusion 534: upper wire fixing member
534a: upper receiving groove 534b: fixing hole
534d: angle adjustment groove 535: second tightening device
536: lower wire fixing member 536a: lower receiving groove
537: rotation adjustment part 537a: penetration hole
538: rotation fixing member 538a: locking member

MODE FOR INVENTION

The present disclosure relates to a trap-type live wire terminal insulation cap for fixing a cut electric wire, and relates to an indirect live wire insulation method for a jumper wire using the trap-type live wire terminal insulation cap. More specifically, disclosed is a technical field relating to a trap-type live wire terminal insulation cap and an indirect live wire insulation method for a jumper wire using the same, in which the trap-type live wire terminal insulation cap: realizes easy insertion and fixing of a terminal of an electric wire (hereinafter, referred to as 'a jumper wire W'), i.e., the jumper wire which has been cut by cutting work during new installation, replacement, or repair of an electric wire and which is hung from a pole in a state where the terminal of the jumper wire is exposed, thereby being capable of wrapping, insulating, and protecting the terminal of the jumper wire W, a terminal end a charging part of a jumper wire; has a plurality of gripping members inserted in the form of a trap that is operated only in one direction so as to prevent separation of the fixed jumper wire W when the fixed jumper wire W is moved in a direction of separation, thereby being capable of maintaining a more firmly and safely fixed state and preventing safety incidents caused by high voltage current; and realizes the trap form of the gripping members 200, which is operated only in one direction, to be released by a simple operation of moving an operation head 300 so that fixation of the jumper wire W is capable of being released, thereby being capable of realizing releasing work to be safely and easily performed.

In addition, in the present disclosure, a hanger-type jumper wire supporting member 400, which is installed at an electric wire L having tension, a suspension insulator, or a crossarm in the shape of '☐' or 'L' and to which a rear side of the trap-type live wire terminal insulation cap C is coupled, and a crossarm-type jumper wire supporting member 500, which is installed at a crossarm, especially at a square crossarm or a single-type crossarm, and to which the rear side of the trap-type live wire terminal insulation cap C is coupled, are used so that the cut jumper wire W is stably and firmly fixed at a predetermined position, thereby being capable of preventing an accident caused by high voltage current during insulating work and being capable of increasing work efficiency.

In order to realize the present disclosure as described above, a configuration of the present disclosure includes: a base body 100 into which a terminal of the jumper wire W is inserted, the base body 100 having a front side of an outer circumference provided with a plurality of operation holes 112 formed therethrough; the plurality of gripping members 200 having front sides thereof hinge-coupled to the operation holes 112 of the base body 100, the gripping members 200 having respective links 210 that protrude on front side upper portions of the gripping members 200; and the operation head 300 slidably coupled to the front side of the outer circumference of the base body 100 such that the operation head 300 is elastically supported rearward, the operation head 300 which has a front surface provided with respective operation grooves 310 corresponding to the operation holes 112 and to which the links 210 of the gripping members 200 are hinge-coupled to the operation grooves 310, and includes the hanger-type jumper wire supporting member 400 having an upper portion coupled to the electric wire L having tension or the suspension insulator and having a lower portion to which a rear side of the base body 100 is coupled.

In order to realize the present disclosure as described above, another configuration of the present disclosure includes: a base body 100 into which a terminal of the jumper wire W is inserted, the base body 100 having a front side of an outer circumference provided with a plurality of operation holes 112 formed therethrough; the plurality of gripping members 200 having front sides thereof hinge-coupled to the operation holes 112 of the base body 100, the gripping members 200 having respective links 210 that protrude on front side upper portions of the gripping members 200; and the operation head 300 slidably coupled to the front side of the outer circumference of the base body 100 such that the operation head 300 is elastically supported rearward, the operation head 300 which has a front surface provided with respective operation grooves 310 corresponding to the operation holes 112 and to which the links 210 of the gripping members 200 are hinge-coupled to the operation grooves 310, and includes the crossarm-type jumper wire supporting member 500 having an upper portion coupled to a crossarm S and to which a rear side of the base body 100 is coupled to at least one of both sides of the crossarm-type jumper wire supporting member 500.

In addition, the base body 100 of the present disclosure includes: a rear body 110 into which the terminal of the jumper wire W is inserted and which has a front side of an outer circumference provided with the plurality of operation holes 112 formed therethrough; and a front body 120 into which a front side of the rear body 110 is inserted and coupled, the front body 120 having a rear surface provided with a plurality of installation grooves 122 so as to be positioned outside the rear body 110, and the front body 120 being provided with respective elastic members 124 installed in the installation grooves 122, and the operation head 300 includes an elastic supporting part 320 which protrudes on an outer circumference of the operation head 300 and which supports rear sides of the elastic members 124.

In addition, the gripping members 200 of the present disclosure include respective teeth parts 220 formed on rear lower surfaces of the gripping members 200, and the teeth parts 220 are formed in curved shapes.

In addition, the hanger-type jumper wire supporting member 400 of the present disclosure includes: a coupling ring 410 having an upper portion hung and coupled to the electric wire L having tension or the suspension insulator; and an insulation rope 420 having an upper portion coupled to a lower portion of the coupling ring 410 and having a lower portion coupled to the rear side of the base body 100.

In addition, the coupling ring 410 of the present disclosure includes: a first hook 412 having an upper inner side provided with a first hanging groove into which the electric wire L having tension is capable of being inserted and hung, the first hook 412 having a first side surface provided with a rail groove 412a formed in an arc shape and having an upper rear side opened; a separation prevention lever 414 having an upper terminal opened such that a second hanging groove corresponding to the first hanging groove of the first hook 412 is formed, the separation prevention lever 414 having an upper portion formed in a shape corresponding to a shape of the rail groove 412a of the first hook 412 and coupled to the rail groove 412a such that the separation prevention lever 414 is capable of being rotated along the rail groove 412a, and the separation prevention lever 414 having a lower portion that protrudes toward the opened upper rear side of the first hook 412; and a second hook 416 having a third hanging groove corresponding to the first hanging groove of the first hook 412, the second hook 416 being coupled to the first side surface of the first hook 412 and closing a first side of the rail groove 412a of the first hook 412 and a first side of the opened upper rear side of the first hook 412.

In addition, the crossarm-type jumper wire supporting member 500 of the present disclosure includes: a base frame 510 having a length in a vertical direction; a fixing part 520 coupled to an upper portion of the base frame 510 and installed on the crossarm S; and a position adjustment part 530 slidably coupled to the base frame 510 and coupled to the base frame 510 such that the rear side of the base body 100 is capable of being rotated.

In addition, the fixing part 520 of the present disclosure includes a coupling part 521 having a front side opened, the coupling part 521 being formed on an upper portion and a lower portion of the fixing part 520 so as to be coupled to the upper portion of the base frame 510.

In addition, the fixing part 520 of the present disclosure includes: a lower supporting member 522 hinge-coupled to a rear side of the fixing part 520; and a first tightening device 523 hinge-coupled to a rear lower portion of the fixing part 520, the first tightening device 523 having an upper portion hinge-coupled to a rear side of the lower supporting member 522 and being configured to move the lower supporting member 522 up and down.

In addition, the fixing part 520 of the present disclosure includes a square crossarm fixing member 524 having an upper portion coupled to an inner upper portion of the fixing part 520.

In addition, the position adjustment part 530 of the present disclosure includes: a moving body 531 slidably coupled to the base frame 510; a locking part 532 installed on a rear side of the moving body 531 and configured to fix or release a sliding movement of the moving body 531; and a coupling protrusion 533 that protrudes on a front surface of the moving body 531, the coupling protrusion 533 being coupled such that the rear side of the base body 100 is capable of being rotated.

In addition, the coupling protrusion 533 of the present disclosure includes a pair of coupling protrusions 533 that protrudes from both sides of a rear surface of the moving body 531.

In addition, the position adjustment part 530 of the present disclosure includes: an upper wire fixing member 534 having an upper portion of a rear surface thereof coupled to an upper portion of a front surface of the moving body 531 such that the upper wire fixing member 534 is capable of being rotated, the upper wire fixing member 534 having a front side of a lower surface provided with an upper accommodating groove 534a in which the jumper wire W is capable of being accommodated; a second tightening device 535 having an upper portion which penetrates a rear side of the lower surface of the upper wire fixing member 534 and which is screw-coupled to the upper wire fixing member 534; and a lower wire fixing member 536 having a rear side through which the second tightening device 535 penetrates and to which the second tightening device 535 is screw-coupled, the lower wire fixing member 536 being installed spaced apart from a lower portion of the upper wire fixing member 534, and the lower wire fixing member 536 having a front side of an upper surface provided with a lower accommodating groove 536a in which the jumper wire W is capable of being accommodated.

In addition, the position adjustment part 530 of the present disclosure includes: a rotation adjustment part 537 which protrudes on a lower portion of the front surface of the moving body 531 and in which a penetration hole 537a is formed in the vertical direction; and a rotation fixing member 538 which is inserted into and coupled to a lower portion of the penetration hole 537a of the rotation adjustment part 537 and which is provided with a locking member 538a configured to be moved upward and downward along the penetration hole 537a, and the upper wire fixing member 534 includes an angle adjustment groove 534d including a plurality of angle adjustment grooves 534d formed in the rear side of the lower surface of the upper wire fixing member 534 in left and right directions, the angle adjustment grooves 534d being configured such that the locking member 538a of the rotation fixing member 538 is capable of being inserted and pulled.

In addition, in order to realize the present disclosure as described above, there is provided an indirect live wire insulation method for a jumper wire using a trap-type live wire terminal insulation cap, the indirect live wire insulation method for the jumper wire using the trap-type live wire terminal insulation cap C including: a first preparation process S10 in which the hanger-type jumper wire supporting member 400 or the crossarm-type jumper wire supporting member 500 is installed around a jumper wire W that requires work; a second preparation process S20 in which a rear side of the trap-type live wire terminal insulation cap C is coupled to the hanger-type jumper wire supporting member 400 or the crossarm-type jumper wire supporting member 500; a cutting process S30 in which the jumper wire W that requires work is cut; and a fastening process S40 in which a terminal of the jumper wire W that is cut is inserted into and fixed to the trap-type live wire terminal insulation cap C.

Hereinafter, the present disclosure will be described in detail as follows with reference to FIG. 1 to FIG. 29 illustrating an embodiment of the present disclosure.

The base body 100, which is a main configuration of the trap-type live wire terminal insulation cap C, for realizing the present disclosure is configured as follows.

A distal end of the jumper wire W, i.e., a terminal of the cut jumper wire W is inserted into the base body 100, and the plurality of operation holes 112 is formed through a front side of an outer circumference of the base body 100. Furthermore, the base body 100 is formed of a insulation material, has a hollow having a front side thereof opened such that the terminal of the cut jumper wire W is inserted into the base body 100 from the front side to a rear side of the base body 100, and the jumper wire W inserted by the plurality of gripping members 200 and the operation head 300 that will be described in detail is fixed, so that the terminal of the jumper wire W in which the terminal is cut and exposed is capable of being wrapped, insulated, and protected.

Specifically, the base body 100 of the present disclosure includes the rear body 110 having an insertion groove (not shown) into which the terminal of the cut jumper wire W is inserted and having the plurality of operation holes 112 formed through the front side of the outer circumference of the base body 100 along a longitudinal direction, and includes the front body 120 into which the front side of the rear body 110 is inserted and coupled, the front body 120 having an insertion hole (not shown) formed through the front body 120 such that the insertion hole is in communication with the insertion groove, the front body 120 having the rear surface thereof provided with the plurality of installation grooves 122 so as to be positioned outside the rear body 110, and the front body 120 having the elastic member 124 installed in the installation grooves 122.

In the rear body 110, the plurality of operation holes 112 is formed such that the plurality of operating holes 112 formed through the front side of the outer circumference of the rear body 110 has a predetermined length that is longer than a length of the gripping members 200 which will be described in detail later, so that the gripping members 200 are capable of being smoothly rotated when the gripping members 200 are rotated around a hinge shaft, and also rear sides of the gripping members 200 are capable of being moved inward while the gripping members 200 are rotated around the hinge shaft. Therefore, the plurality of gripping members 200 is moved inward and is formed in a trap that is operated only in one direction, so that the terminal of the jumper wire W that is exposed after the inserted jumper wire W is fixed is wrapped, insulated, and protected.

That is, in the rear body 110, the insertion groove with an opened front surface is formed so that the terminal of the cut jumper wire W is capable of being inserted into the rear body, so that the exposed terminal of the jumper wire W is capable of being wrapped, insulated, and protected when the jumper wire W is inserted into the rear body 110.

In addition, the operation hole 112 allows the gripping member 200 which will be described in detail later to be rotated around the hinge shaft so that the rear side of the gripping member 200 is capable of being moved toward the base body 100, i.e., toward the inside of the rear body 110. Therefore, the plurality of gripping members 200 forms the trap that is operated only in one direction or not forms the trap that is operated only in one direction, so that the jumper wire W inserted inside the base body 100 is capable of being fixed or released.

At this time, the rear body 110 includes a first hinge groove 114 which is formed in an annular shape on the front side of the outer circumference of the rear body 110 and which is positioned on a front side of the operation hole 112, and includes a first elastic ring 116 which is coupled to the first hinge groove 114 and to which the front side of the gripping member 200 that will be described in detail later is coupled. Furthermore, the first elastic ring 116 is coupled to the first hinge groove 114 such that the front side of the gripping member 200 is hinge-coupled to the first elastic ring, so that the rear side of the gripping member 200 is capable of being moved inward through the operation hole 112 while the gripping member 200 is rotated.

That is, in the first hinge groove 114, the front side of the gripping member 200 is coupled to the rear body 110 by the first elastic ring 116, so that the rear side of the gripping member 200 is capable of being moved to the inner side of the rear body 110, and a rear side of the first elastic ring 116 is rotated around the front side of the gripping member 200 so as to be moved to the inner side of the rear body 110 through the operation hole 112.

At this time, the first elastic ring 116 may be formed in a ring shape having a conventional metal material so that the front side of the gripping member 200 is capable of being hinge-coupled to the rear body 110. However, since the first elastic ring 116 may be stretched due to repeated rotation of the gripping member 200 and the gripping member 200 may not be smoothly rotated, it is preferable that the first elastic ring 116 is a snap ring having a first end is separated and configured to resist opening, i.e., an elastic ring having an elastic force in a direction of tightening.

Meanwhile, the rear body 110 includes a coupling part 113 which protrudes on the rear side of the rear body 110 and in which a coupling hole 113a is formed therethrough. The coupling part 113 is coupled to the hanger-type jumper wire supporting member 400 or the crossarm-type jumper wire supporting member 500 which will be described in detail later, and allows the cut jumper wire W is positioned at a predetermined position by the trap-type live wire terminal insulation cap C of the present disclosure, thereby realizing an effect of safely and efficiently performing work.

As the front side of the rear body 110 is inserted into and coupled to the front body 120, the operation head 300 which will be described in detail later is prevented from being separated frontward. Furthermore, the front body 120 has an extension part (not shown) which protrudes and extends in an outer direction of the rear body 110, has the plurality of installation grooves 122 formed in a rear surface of the extension part, and includes the elastic member 124 installed in the installation grooves 122 such that a front side of the elastic member 124 is supported and a rear side of the elastic member 124 is supported by the operation head 300.

That is, when the operation head 300, which will be described in detail later, is slidably coupled to the front side of the outer circumference of the rear body 110, the extension part of the front body 120 prevents the operation head 300 from being separated frontward and also elastically supports the operation head 300 rearward by the elastic member 124, so that the operation head 300 is maintained in a state in which the operation head 300 is moved rearward.

At this time, the operation head 300 is hinge-coupled to the link 210 formed at the upper portion of the gripping member 200 which will be described in detail later, and the operation head 300 is configured to move the link 210 of the gripping member 200 rearward, so that the gripping member 200 is rotated around the base body 100, i.e., rotated around the hinge shaft hinge-coupled to the rear body 110, i.e., rotated around the first elastic ring 116 so that the rear side of the gripping member 200 is moved to the inner side of the rear body 110 through the operation hole 112. Accordingly, the plurality of gripping members 200 forms the trap that is operated only in one direction, and an effect of maintaining the inserted jumper wire W to be in a stably and firmly fixed state is realized.

In addition, the front body 120 may further include a corresponding groove (not shown) formed in a rear side of an outer circumference of the front body 120 so as to correspond with the operation hole 112 in order to prevent the front side of the operation hole 112 from being closed as the front side of the rear body 110 is inserted and coupled to the front body 120.

In addition, the rear body 110 may further include a limiting part 118 that protrudes on the outer circumference of the rear body 118 so as to limit a rearward movement of the operation head 300 that is described above. Furthermore, it is obvious that the limiting part 118 is formed on the outer circumference of the rear body 110, i.e., the limiting part 118 is formed on a position where an effect of preventing damage to the gripping member 200 and the rear body 110 is capable of being realized by preventing the gripping member 200 from being rotated up to a rotation limit.

The gripping member 200, which is a main configuration of the trap-type live wire terminal insulation cap C, for realizing the present disclosure is configured as follows.

The gripping member 200 is formed of an insulation material, has the front side hinge-coupled to the base body 100, i.e., the operation hole 112 of the rear body 110. Furthermore, the gripping member 200 has the link 210 that protrudes on the upper portion of the front side of the gripping member 200, and includes the plurality of gripping members 200 as described above. Furthermore, as the link 210 is moved rearward by the operation head 300 and the rear sides of the gripping members 200 are moved to the inner side of the rear body 110 through the operation holes 112, the plurality of gripping members 200 forms the trap that is operated only in one direction, so that the inserted jumper wire W is capable of being stably and firmly fixed.

In other words, as described above, a structure in which the front side of the gripping member 200 of the present disclosure is hinge-coupled to the operation hole 112 of the rear body 110 is realized such that the first elastic ring 116 is coupled to the first hinge groove 114 which is formed on the front side of the outer circumference of the rear body 110 and which is positioned on the front side of the operation hole 112, and the front side of the gripping member 200 is hinge-coupled by the first elastic ring 116.

In addition, the trap in which the plurality of gripping members 200 of the present disclosure is operated only in one direction is realized such that the operation head 300 which will be described in detail later is hinge-coupled to the link 210 and the rear side of the gripping member 200 is moved toward the inner side of the rear body 110 while the gripping member 200 is rotated around the first elastic ring 116 when the link 210 is moved rearward by the operation head 300 that is coupled to the rear body 110 so as to be elastically supported rearward.

That is, the gripping member 200 of the present disclosure is formed in an 'L' shape, and an edge of the gripping member 200 is hinge-coupled to the rear body 110 by the first elastic ring 116, and the link 210 that protrudes upward is coupled to the operation head 300 which will be described in detail later. Therefore, the gripping member 200 is rotated by a front and rear movement of the operation head 300, so that an operation in which the trap where the plurality of gripping members 200 is operated only in one direction or an operation in which the trap that is operated only in one direction is released is performed, thereby fixing or releasing the jumper wire W inserted into the rear body 110.

At this time, since the link 210 is required to be rotated while moving in front and rear directions by the operation head 300, a long hole (not shown) is formed so that the hinge shaft is capable of being smoothly moved in the front and rear directions at the same time when the link 210 is hinge-coupled to the operation head 300.

In addition, the gripping member 200 of the present disclosure includes a teeth part 220 formed on the rear lower surface of the gripping member 200. When the plurality of gripping members 200 forms the trap that is only operated in one direction and the jumper wire W inserted into the rear body 110 is fixed, the rear lower surface of the gripping member 200 is in contact with the jumper wire W and fixes the jumper wire W, so that the teeth part 220 is formed on the rear lower surface of the gripping member 200 so that a fixing force is formed.

In addition, since the rear side of the gripping member 200 is rotated when the gripping member 200 is rotated around the first elastic ring 116, it is preferable that the teeth part 220 is formed in a curved shape so as to increase a contact area with the jumper wire W.

The operation head 300, which is a main configuration of the trap-type live wire terminal insulation cap C, for realizing the present disclosure is configured as follows.

The operation head 300 is coupled to the base body 110, i.e., the operation head 300 is coupled to the front side of the outer circumference of the rear body 110 such that the operation head 300 is capable of being slid and elastically supported rearward. Furthermore, the operation head 300 has the front surface provided with the operation groove 310 corresponding to the operation hole 112, and the link 210 of the gripping member 200 is hinge-coupled to the operation groove 310. Furthermore, the operation head 300 is formed of an insulation material, is elastically supported rearward such that the link 210 of the gripping member 200 is moved rearward so as to rotate the gripping member 200 around the first elastic ring 116, so that the plurality of gripping members 200 forms the trap that is operated only in one direction and fixes the inserted jumper wire W. Furthermore, when a worker moves the operation head 300 by using an insulation stick (not shown), the operation head 300 moves the link 210 of the gripping member 200 frontward so that the trap of the plurality of gripping members 200 that is operated in only one direction is released, thereby releasing the fixing of the inserted jumper wire W.

That is, in the operation head 300 of the present disclosure, a through hole (not shown) in which the rear body 110 is capable of being inserted and coupled is formed such that the operation head 300 is capable of being slid on the base body 100, i.e., the front side of the outer circumference of the rear body 110. Furthermore, the operation head 300 is elastically supported rearward by the elastic member 124 that is provided in the front body 120, and the operation head 300 moves the link 210 of the gripping member 200 rearward, or is moved frontward forcibly by the worker so that the link 210 of the gripping member 200 is moved frontward. Accordingly, the plurality of gripping members 200 forms the trap that is operated only in one direction and fixes the jumper wire W, or releases the trap of the plurality of gripping members 200 that is operated only in one direction so as to release the fixation of the jumper wire W, thereby performing insulating work.

At this time, the operation head 300 of the present disclosure has the front surface provided with the operation groove 310 corresponding to the operation hole 112, so that the link 210 of the gripping member 200 is capable of being smoothly moved and rotated in the front and rear directions.

In addition, the operation head 300 of the present disclosure includes a second hinge groove 330 which is formed in an annular shape on a front side of an outer circumference of the operation head 300 and which is positioned on a front side of the operation groove 310, and includes a second elastic ring 340 which is coupled to the second hinge groove 330 and to which the link 210 of the gripping member 200 is coupled. Furthermore, the second elastic ring 340 is coupled to the second hinge groove 330 such that the link 210 of the gripping member 200 is hinge-coupled thereto, so that the gripping member 200 and the link 210 is rotated and moved in the front and rear directions when the operation head 300 is slidably moved along the rear body 110 in the front and rear directions, thereby rotating the gripping member 200 around the first elastic ring 116.

In addition, when the link 210 is moved in the front and rear directions, the upper portion of the link 210 is rotated in the front and rear directions. That is, when the operation head 300 is moved along the rear body 110 in the front and rear directions, the link 210 is moved in the front and rear directions, so that the gripping member 200 is rotated around the first elastic ring 116 that is fixed.

That is, in the operation head 300 of the present disclosure, when the second elastic ring 240 is coupled to the long hole of the link 210 and is moved along the rear body 110 in the front and rear directions, the link 210 is rotated around the first elastic ring 116 in the front and rear directions, and the upper portion of the link 210 is moved in the front and rear directions so that the rear side of the gripping member 200 is rotated around the first elastic ring 116, so that the gripping member 200 is moved to the base body 110 through the operation hole 112, i.e., the gripping member 200 is moved to the inner side of the rear body 110.

In addition, similar to the first elastic ring 116 as described above, the second hook 340 may be formed in a ring shape having a conventional metal material so that the link 210 of the gripping member 200 is capable of being hinge-coupled to the operation head 300. However, since the second elastic ring 340 may be stretched due to repeated rotation of the gripping member 200 and the gripping member 200 may not be smoothly rotated, it is preferable that the second elastic ring 340 is a snap ring having a first end is separated and configured to resist opening, i.e., an elastic ring having an elastic force in a direction of tightening.

In relation to the description above, the operation head 300 of the present disclosure includes an elastic supporting part 320 which is formed on the outer circumference of the operation head 300 and which supports the rear side of the elastic member 124 that is provided in the front body 120 that is described above. Furthermore, the elastic supporting part 320 elastically supports the operation head 300 rearward from the fixed front body 120 by the elastic member 124, so that the link 210 of the gripping member 200 is moved rearward by the operation head 300, thereby realizing the plurality of gripping members 200 to be formed in the trap that is operated only in one direction normally.

That is, since the operation head 300 of the present disclosure is elastically supported rearward by the elastic member 124, the plurality of gripping members 200 forms the trap that is operated only in one direction. Therefore, an outer circumference of the jumper wire W inserted into the rear body 110 is fixed by the teeth part 220, so that the cut and exposed terminal of the jumper wire W is capable of being wrapped, insulated, and protected by the rear body 110.

At this time, in the operation head 300 of the present disclosure, as the jumper wire W is inserted into the rear body 110, the rear side of the plurality of gripping members 200 that form the trap which is operated only in one direction is moved to an outer direction of the rear body 110 by the jumper wire W and is moved frontward, the worker can fix the cut jumper wire W to the trap-type live wire terminal insulation cap C by simply inserting the jumper wire W without any particular process, so that an effect of easily performing insulating work may be realized.

In addition, the operation head 300 of the present disclosure may include a protection cover 350 coupled to the front side of the outer circumference of the operation head 300. Furthermore, in order to stably perform the operation of the gripping member 200, the protection cover 350 includes a penetration hole (not shown) configured to prevent separation of the second elastic ring 340 and formed so as to correspond to the elastic member 124 such that elastic support of the elastic member 124 is stably realized, i.e., the penetration hole formed through a position corresponding to the installation groove 122 of the front body 120, and includes an insertion groove (not shown) into which the link 210 of the gripping member 200 is inserted.

That is, the protection cover 350 is coupled to the front side of the outer circumference of the operation head 300, is configured to prevent separation of the second elastic ring 340 through an inner circumferential surface in close contact with the outer circumference of the operation head 300, is configured to guide the link 210 of the gripping member 200 to be stably moved in the front and rear directions through the insertion groove, and is configured such that the operation head 300 is elastically supported rearward by the elastic member 124 stably.

Furthermore, the first elastic ring 116 is configured such that the inner circumferential surface of the operation head 300 is in close contact with the outer circumference of the rear body 110, so that separation of the first elastic ring 116 is prevented and there is an effect that the rotation of the gripping member 200 is stably performed.

As a result, in the trap-type live wire terminal insulation cap C of the present disclosure, the worker may easily fix the cut jumper wire W by only inserting the jumper wire W into the base body 100, i.e., the rear body 110, since the plurality of gripping members 200 forms the trap that is operated only in one direction by the operation head 300. Furthermore, when the inserted jumper wire W is moved in a direction in which the jumper wire W is separated, i.e., when the inserted jumper wire W is about to be pulled out, the plurality of gripping members 200 is rotated such that the plurality of gripping members 200 forms the trap that is operated only in one direction, so that the inserted jumper wire W is prevented from being separated. Furthermore, when the worker uses the insulation stick and so on, the operation head 300 is capable of being moved frontward by using the elastic supporting part 320, so that the fixation of the inserted jumper wire W is capable of being easily released, thereby being capable of realizing an effect of increasing work efficiency.

In relation to the description described above, since the trap-type live wire terminal insulation cap C of the present disclosure is installed at a predetermined position around an electric pole so that the cut jumper wire W is stably insulated and protected at a predetermined position, insulating work is capable of being safely and efficiently performed. To this end, the hanger-type jumper wire supporting member 400 which is installed on a suspension insulator or an electric wire L that is not cut, i.e., the electric wire L having tension.

In addition, in a working condition in which the hanger-type jumper wire supporting member 400 is difficult to be installed on the suspension insulator or the electric wire L having tension, the trap-type live wire terminal insulation cap C of the present disclosure may include the crossarm-type jumper wire supporting member 500 installed on the crossarm S.

That is, in the trap-type live wire terminal insulation cap C of the present disclosure, after the hanger-type jumper wire supporting member 400 or the crossarm-type jumper wire supporting member 500 are mounted on the electric wire L having tension, the suspension insulator, or the crossarm S according to a working condition, the coupling part 113 formed on the rear side of the rear body 110 is coupled to the hanger-type jumper wire supporting member 400 or the crossarm-type jumper wire supporting member 500, thereby realizing an effect of wrapping, insulating, and protecting the cut jumper wire W at a predetermined position.

In more detail, an upper portion of the hanger-type jumper wire supporting member 400 is coupled to the electric wire L having tension or the suspension insulator, and a lower portion of the hanger-type jumper wire supporting member 400 is coupled to the rear side of the base body 100 of the trap-type live wire terminal insulation cap C, i.e., the coupling part 113 formed on the rear side of the rear body 110.

Specifically, the hanger-type jumper wire supporting member 400 of the present disclosure includes the coupling ring 410 having an upper portion hung and coupled to the electric wire L having tension or the suspension insulator, and includes the insulation rope 420 having an upper portion coupled to a lower portion of the coupling ring 410 and having a lower portion coupled to the rear side of the base body 100.

That is, the worker first installs the hanger-type jumper wire supporting member 400 on the electric wire L or the suspension insulator, and then couples the rear side of the trap-type live wire terminal insulation cap C to the hanger-type jumper wire supporting member 400. Otherwise, after the worker couples the insulation rope 420 to the rear side of the trap-type live wire terminal insulation cap C of the present disclosure, then installs the hanger-type jumper wire supporting member 400 by hanging the coupling ring 410 on the electric wire L having tension or the suspension insulator, and then inserts and fixes the terminal of the cut jumper wire W to the rear body 110 of the trap-type live wire terminal insulation cap C of the present disclosure.

However, in the latter case, when the trap-type live wire terminal insulation cap C is first installed on the insulation rope 420, it may be difficult to install the hanger-type jumper wire supporting member 400 since the overall load is increased or the center of gravity is positioned at the trap-type live wire terminal insulation cap C, so that it is preferable that the coupling ring 410 is hung and installed first.

Meanwhile, in the hanger-type jumper wire supporting member 400, when the coupling ring 410 is installed on the electric wire L having tension or the suspension insulator, the separation prevention lever 414 is rotated or is automatically rotated after the coupling ring 410 is hung and installed on the electric wire L having tension or the suspension insulator in order to maintain a state in which the hanger-type jumper wire supporting member 400 is stably installed on the electric wire L having tension or the suspension insulator, so that a lower portion of the electric wire L having tension or a lower portion of the suspension insulator is surrounded, thereby preventing the coupling ring 410 from being separated from the electric wire L having tension or the suspension insulator.

In addition, the coupling ring 410 includes: the first hook 412 having an upper inner side provided with the first hanging groove into which the electric wire L having tension or the suspension insulator is capable of being inserted and hung, the first hook 412 having a first side surface provided with a rail groove 412a formed in an arc shape and having an upper rear side opened, and the first hook 412 being coupled to an upper portion of the insulation rope 420; the separation prevention lever 414 having an upper terminal opened such that the second hanging groove (not shown) corresponding to the first hanging groove of the first hook 412 is formed, the separation prevention lever 414 having an upper portion formed in a shape corresponding to a shape of the rail groove 412a of the first hook 412 and coupled to the rail groove 412a such that the separation prevention lever 414 is capable of being rotated along the rail groove 412a, and the separation prevention lever 414 having a lower portion that protrudes toward the opened upper rear side of the first hook 412; and the second hook 416 having the third hanging groove (not shown) corresponding to the first hanging groove of the first hook 412, the second hook 416 being coupled to the first side surface of the first hook 412 and closing a first side of the rail groove 412a of the first hook 412 and a first side of the opened upper rear side of the first hook 412.

That is, the separation prevention lever 414 is configured such that the upper portion of the separation prevention lever 414 rotated along the rail groove 412a of the first hook 412 and opened is moved toward the opened lower portion of the first hanging groove so that the electric wire L having tension or the suspension insulator is capable of being hung in the first hanging groove, and then the separation prevention lever 414 is rotated in an opposite direction along the rail groove 412a of the first hook 412 so that the opened lower portion of the first hanging groove is closed and the electric wire L having tension or the suspension insulator is surrounded in the upper portion of the second hanging groove, thereby maintaining a state in which the coupling ring 410 is stably coupled to the jumper wire W having tension.

At this time, in order to easily close the opened lower portion of the first hanging groove by rotating the separation prevention lever 414, in the first hook 412, it is preferable that the front side of a middle end that corresponds to the rear side of the first hanging groove is opened and the rear side of the opened upper portion of the first hook 412 extends and is opened to the rear side of the middle end. This is to more smoothly rotates the separation prevention lever 414 along the rail groove 412a so as to close or open the first hanging groove.

In addition, the first hook 412 limits a rotation angle formed when the separation prevention lever 414 is rotated to open the first hanging groove by an upper step (not shown) formed by the rear side of the upper portion of the first hook 412, and limits a rotation angle formed when the separation prevention lever 414 is rotated to close the first hanging groove by a lower step (not shown) formed by the rear side of the middle end of the first hook 412.

At this time, a gripping hole (not shown) is formed on a lower portion thereof so that worker can smoothly grip the separation prevention lever 414 and may rotate the separation prevention lever 414 along the rail groove 412a of the first hook 412 and also may easily grip the coupling ring 410. Furthermore, when the worker hangs and installs the coupling ring 410 on the jumper wire W having tension, the gripping hole allows the lower portion of the separation prevention lever 414 to be smoothly rotated upward and also the coupling ring 410 is moved upward while the worker moves the gripping hole upward by using the insulation stick and so on, so that the coupling ring 410 is capable of being more easily installed on the electric wire W having tension or the suspension insulator.

In addition, in the coupling ring 410, in order to realize more stable rotation and to limit the rotation angle of the separation prevention lever 414, auxiliary rail grooves are formed on the first side surface of the first hook 412 and a second side surface of the second hook 416.

In more detail, the first hook 412 includes a first auxiliary rail groove 412b which is formed in the first side surface of the first hook 412 and which is formed in the upper portion of the rail groove 412a in an arc shape, and the separation prevention lever 414 includes an auxiliary protrusion 414a which protrudes on a first side surface and a second side surface of the upper portion of the separation prevention lever 414 and which protrudes such that the auxiliary protrusion 414a is inserted into the first auxiliary rail groove 412b.

At this time, the first auxiliary rail groove 412b is formed in an arc shape such that the first auxiliary rail groove 412b has a length from a position of the auxiliary protrusion 414a at a position where a rotation of the separation prevention lever 414 is limited by the upper step to a position of the auxiliary protrusion 414a where the rotation of the separation prevention lever 414 is limited by the lower step when the separation prevention lever 414 is rotated upward or downward.

In addition, as described above, a protrusion position of the auxiliary protrusion 414a is positioned in response to the positions in which upward or downward rotation of the separation prevention lever 414 is limited, and is positioned at a position where the rotation of the separation prevention lever 414 is capable of being limited by the first auxiliary rail groove 412b.

In addition, the hanger-type jumper wire supporting member 400 may include a quick link 430 coupled to the lower portion of the insulation rope 420. Furthermore, the quick link 430 is formed of a one-touch-type ring called a karabiner, and realizes an effect of easily coupling the rear side of the trap-type live wire terminal insulation cap of the present disclosure.

Furthermore, in order to couple the trap-type live wire terminal insulation cap C of the present disclosure, tying a knot of a lower terminal of the insulation rope 420 is required to be performed, but it is difficult to perform.

Therefore, it is preferable to couple the rear side of the trap-type live wire terminal insulation cap C of the present disclosure by using the quick link 430 as described above.

At this time, the trap-type live wire terminal insulation cap C of the present disclosure is capable of being moved freely by the insulation rope 420, so that the fixing of the cut jumper wire W may be more smoothly performed. Furthermore, the hanger-type jumper wire supporting member 400 is capable of being easily installed on the jumper wire W having tension, the suspension insulator, or the crossarm in the shape of '☐' or 'L' by using the coupling ring 410.

The crossarm-type jumper wire supporting member 500 has an upper portion coupled to a single-type crossarm having a curved upper surface or a square crossarm having a rectangular cross-sectional shape among the crossarms S, and at least one of both sides thereof is coupled to the rear side of the trap-type live wire terminal insulation cap C of the present disclosure, i.e., the rear side of the base body 100.

Specifically, the crossarm-type jumper wire supporting member 500 includes: the base frame 510 having a length in the vertical direction; the fixing part 520 coupled to an upper portion of the base frame 510 and installed on the crossarm S; and the position adjustment part 530 slidably coupled to the base frame 510 and coupled to the rear side of the trap-type live wire terminal insulation cap C of the present disclosure, i.e., rear side of the base body 100. That is, the position adjustment part 530 is coupled to the rear side of the base body 100 such that the coupling part 113 of the rear body 110 is capable of being rotated.

In order to reduce the load, a hollow is formed inside the base frame 510, and the fixing part 520 is fixed and installed on the square crossarm or the single-type crossarm. Furthermore, after the position adjustment part 530 is coupled such that the rear side of the trap-type live wire terminal insulation cap C of the present disclosure is capable of being rotated, a position of the trap-type live wire terminal insulation cap C is capable of being adjusted by moving the position adjustment part 530 along the base frame 510, thereby being capable of realizing an effect of smoothly fixing the cut jumper wire W.

The fixing part 520 includes the coupling part 521 having a front side opened such that the crossarm S is capable of being inserted into the opened front side and fixed, the coupling part 521 being formed on the upper and lower portions of the fixing part 520 so as to be coupled to the upper portion of the base frame 510. Furthermore, the trap-type live wire terminal insulation cap C of the present disclosure is capable of being positioned at the upper or lower portions of the crossarm S by using the coupling part 521.

That is, in a situation in which the fixing part 520 is coupled to the upper portion of the base frame 510 through the coupling part 521 that is formed on the lower portion of the fixing part 520, when the fixing part 520 is coupled to the crossarm S, the base frame 510 is positioned below the crossarm S and the trap-type live wire terminal insulation cap C of the present disclosure is positioned below the crossarm S. Furthermore, in a situation in which the fixing part 520 is coupled to the lower portion of the base frame 510 through the coupling part 521 formed on the upper portion of the fixing part 520, when the fixing part 520 is coupled to the crossarm S, the base frame 510 is positioned above the crossarm S and the trap-type live wire terminal insulation cap C of the present disclosure is positioned above the crossarm S.

At this time, the fixing part 520 includes the lower supporting member 522 coupled to the rear side of the fixing part 520, and includes the first tightening device 523 which is hinge-coupled to the rear lower portion of the fixing part 520 and which has an upper portion hinge-coupled to the rear side of the lower supporting member 522 and configured to move the lower supporting member 522 up and down. Furthermore, after the crossarm S is inserted into the opened front side of the fixing part 520, there is an effect of firmly fixing the lower supporting member 522 to the crossarm S by using the first tightening device 523 such that the lower supporting member 522 is rotated upward.

That is, when the crossarm S is inserted into the opened front side of the fixing part 520, the lower supporting member 522 is rotated downward by using the first tightening device 523 so that the crossarm S is smoothly inserted into the fixing part 520, and then the lower supporting member 522 is rotated upward by using the first tightening device 523, thereby firmly fixing the lower supporting member 522 to the crossarm S.

At this time, the first tightening device 523 is a 'RELEASE DIRECTION OVERLOAD PREVENTION CLUTCH TYPE FASTENING DEVICE' which is Korean Patent No. 10-2082150 filed and registered by the applicant of the present disclosure. Furthermore, the first tightening device 523 is capable of rotating the lower supporting member 522 up and down by being operated with an insulation stick and so on. Furthermore, when the lower supporting member 522 is rotated downward, the first tightening device 523 prevents the crossarm-type jumper wire supporting member 500 from being rapidly separated from the crossarm S due to overload, thereby realizing an effect of safely finishing insulating work.

In addition, the fixing part 520 may include the square crossarm fixing member 524 having the upper portion thereof coupled to the inner upper portion of the fixing part 520. Unlike the single-type crossarm, since the upper surface of the square crossarm is not formed in a curved shape, a lower surface of the square crossarm fixing member 524 is formed horizontally. That is, if necessary, the fixing part 520 is installed such that the square crossarm fixing member 524 is detached from or attached to the fixing part 520 according to the single-type crossarm and the square crossarm, so that work efficiency may be increased.

The position adjustment part 530 not only adjusts a vertical position of the trap-type live wire terminal insulation cap C of the present disclosure by being slidably moved along the base frame 510, but also couples the rear side of the trap-type live wire terminal insulation cap C such that the rear side of the trap-type live wire terminal insulation cap C is capable of being rotated, so that an angle of the trap-type live wire terminal insulation cap C is capable of being adjusted, thereby being capable of realizing an effect of smoothly fixing the cut jumper wire W.

At this time, the position adjustment part 530 includes the moving body 531 slidably coupled to the base frame 510, the locking part 532 installed on the rear side of the moving body 531 and configured to fix or release the sliding movement of the moving body 531, and the coupling protrusion 533 that protrudes on the front surface of the moving body 531, the coupling protrusion 533 being coupled such that the base body 100 of the trap-type live wire terminal insulation cap C is capable of being rotated. That is, the coupling protrusion 533 is coupled such that the rear side of the rear body 110 is capable of being rotated.

Figure 27:
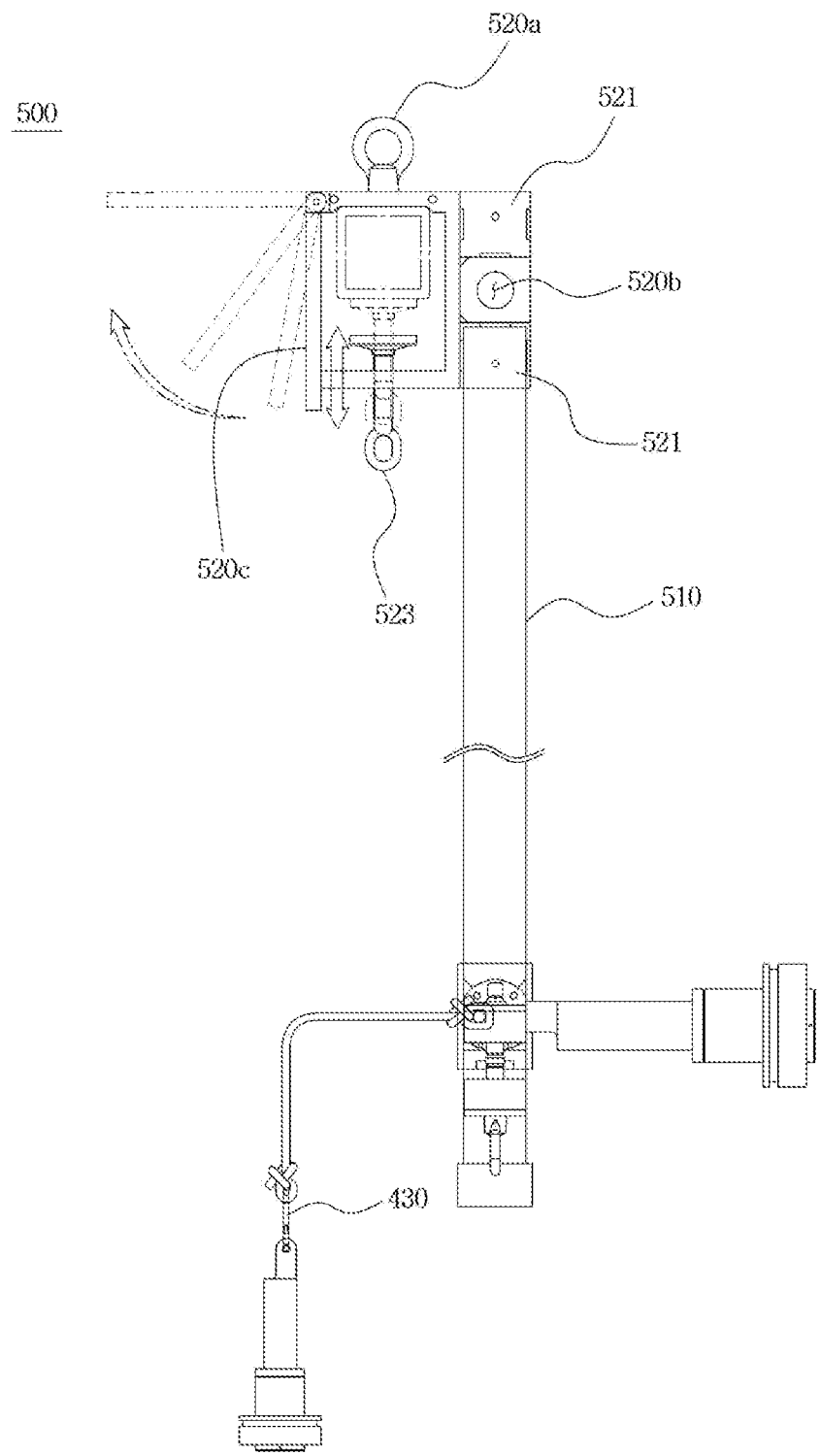
FIG. 27 is a side view illustrating the crossarm-type jumper wire supporting member according to another embodiment of the present disclosure.

In addition, as another embodiment in which the trap-type live wire terminal insulation cap C of the present disclosure is coupled to the coupling protrusion 533, a first end of an insulation rope (not shown) is fixed to the coupling protrusion 533 as illustrated in FIG. 27, and the base body 100 of the trap-type live wire terminal insulation cap C, i.e., the rear side of the rear body 110, is coupled to a second end of the insulation rope, so that the trap-type live wire terminal insulation cap C is capable of being more freely used.

The moving body 531 is coupled to the base frame 510 by surrounding the base frame 510 such that the moving body 531 is capable of being slid on the base frame 531, and is slid and then fixed after a position of the moving body 531 is adjusted by the locking part 532, so that the vertical position of the trap-type live wire terminal insulation cap C that has the rear side coupled by the coupling protrusion 533 which protrudes on the front surface of the moving body 531 is adjusted.

At this time, the locking part 532 includes a fixing block 532a which is installed on an inner rear side of the moving body 51 and which has a front surface in close contact with or spaced apart from a first side surface of the base frame 510, a link bar 532b which has a front side inserted into and coupled to a rear side of the fixing block 532a and which has a front side thereof provided with a hinge hole (not shown) such that the front side of the link bar 532b is hinge-coupled to the rear side of the fixing block 532a toward a hinge shaft (not shown), the link bar 532b being formed in a long hole shape such that the hinge hole at the front side of the link bar 532b has a length in the front and rear directions, an adjustment ring 532c having a front side thereof inserted into and installed in the rear side of the moving body 531 such that the front side of the adjustment ring 532c is hinge-coupled to and installed in the moving body 531, the adjustment ring 532c being configured to move the fixing block 532a rearward by moving the rear side of the link bar 532b in upper rearward or a lower rearward as the adjustment ring 532c is rotated while a front terminal of the adjustment ring 532c is hinge-coupled to the rear side of the link bar 532b, and a pressing elastic member 532d installed in an inner rear side of the moving body 531 and configured to elastically support the fixing block 532a.

In addition, the fixing block 532a includes a packing 532a-1 which protrudes and which is installed in the front side of the fixing block 532a, and the packing 532a-a is configured to be in close contact with the rear surface of the base frame 510 as the pressing block 532a is pressed, thereby fixing the position of the position adjustment part 530 after the position adjustment part 530 is slid along the base frame 510.

That is, as the locking part 532 is pressed by the pressing elastic member 532d so that the packing 532a-1 is in close contact with the rear surface of the base frame 510, the position adjustment part 530 is fixed to the base frame 510. Furthermore, when the position adjustment part 530 is moved upward, the fixing block 532a is moved rearward through the link bar 532b by rotating the adjustment ring 532c upward, the packing 532a-1 is spaced apart from the rear surface of the base frame 510, thereby being capable of adjusting the position of the position adjustment part 530.

At this time, when the locking part 532 is rotated in either an upper direction or a lower direction, the fixing block 532a is moved rearward. Therefore, as the worker rotates the adjustment ring 532c upward, the position adjustment part 530 may be naturally moved upward. Furthermore, as the worker rotates the adjustment ring 532c downward, the position adjustment part 530 may be naturally moved downward.

In other words, the position adjustment part 530 is slidably moved upward or downward and then is fixed by the locking part 432, so that the vertical direction of the trap-type live wire terminal insulation cap C of the present disclosure is capable of being adjusted.

The coupling protrusion 533 is formed in a shape corresponding to the rear side of the base frame 100. That is, the coupling protrusion 533 is formed in a shape corresponding to the coupling hole 113a of the coupling part 113 that is formed in the rear side of the rear body 110. Therefore, in order to the angle of the trap-type live wire terminal insulation cap C of the present disclosure to be smoothly adjusted and to be rotated freely, the coupling protrusion 533 is formed in a cylindrical shape, and a bearing may be additionally installed on an outer circumference of the coupling protrusion 533. At this time, it is obvious that the coupling hole 113a is also formed in a cylindrical shape that is a shape corresponding to the shape of the coupling protrusion 533 or the shape of the coupling protrusion 533 on which the bearing is installed.

In addition, the coupling protrusion 533 includes the pair of coupling protrusions 533 that protrudes on the both sides of the rear surface of the moving body 531 such that the trap-type live wire terminal insulation cap C of the present disclosure is coupled to the both sides of the front side of the position adjustment part 530, so that a pair of cut jumper wires W is capable of being smoothly fixed to the trap-type live wire terminal insulation cap C, thereby realizing an effect of insulating and protecting the jumper wires W.

In addition, the position adjustment part 530 includes a protrusion part (not shown) which protrudes on an upper portion of the front surface of the moving body 531 and which has a lower surface formed in a 'v' shape. Furthermore, the coupling protrusion 533 is formed such that the coupling protrusion 533 is positioned at a lower portion of the protrusion part, and the protrusion part is configured to limit the upward rotation of the trap-type live wire terminal insulation cap C coupled to the coupling protrusion 533, so that work is capable of being smoothly performed and allows the upper wire fixing member 534 to be spaced apart from the front side of the position adjustment part 530.

In relation to the description described above, the position adjustment part 530 includes the upper wire fixing member 534 having an upper portion of a first side surface thereof coupled to the protrusion part, i.e., the upper portion of the front surface of the moving body 531 such that the upper portion of the first surface of the upper wire fixing member 534 is capable of being rotated, the upper wire fixing member 534 having a front side of a lower surface thereof provided with the upper accommodating groove 534a in which the jumper wire W is capable of being accommodated, the second tightening device 535 having an upper portion which penetrates a rear side of the lower surface of the upper wire fixing member 534 and which is screw-coupled to the upper wire fixing member 534, and the lower wire fixing member 536 having a rear side through which the second tightening device 535 penetrates and to which the second tightening device 535 is screw-coupled, the lower wire fixing member 536 being installed spaced apart from a lower portion of the upper wire fixing member 534, and the lower wire fixing member 536 having a front side of an upper surface thereof provided with the lower accommodating groove 536a in which the jumper wire W is capable of being accommodated.

The upper wire fixing member 534, the second tightening device 535, and the lower wire fixing member 536 accommodate and fix the jumper wire W in the upper accommodating groove 534a and the lower accommodating groove 536a before the jumper wire W is cut, or accommodate and fix the jumper wire W that is not cut, thereby being capable of realizing an effect of smoothly performing new installation, replacement, or repair of an electric wire.

At this time, as described above, the upper wire fixing member 534 is installed spaced apart from the front surface of the position adjustment part 530, i.e., the upper wire fixing member 534 is installed spaced apart from the front surface of the moving body 531, so that the trap-type live wire terminal insulation cap C of the present disclosure is capable of being smoothly coupled to the coupling protrusion 533 and is coupled such that the trap-type live wire terminal insulation cap C is capable of being rotated around the position adjustment part 530. Therefore, before the trap-type live wire terminal insulation cap C of the present disclosure is installed, the upper wire fixing member 534 is rotated such that the front side of the coupling protrusion 533 is opened, and then the upper wire fixing member 534 is rotated and positioned at an original position after the trap-type live wire terminal insulation cap C of the present disclosure is installed, thereby preventing the trap-type live wire terminal insulation cap C installed in the coupling protrusion 533 from being separated.

In relation to the description described above, in the upper wire fixing member 534, the second tightening device 535, and the lower wire fixing member 536, when the second tightening device 535 is rotated and the second tightening device 535 is moved to an upper portion of the upper wire fixing member 534, the lower wire fixing member 536 is also moved upward at the same time. Therefore, as a separation distance between the upper accommodating groove 534a and the lower accommodating groove 536a is reduced, the jumper wire W is accommodated between the upper accommodating groove 534a and the lower accommodating groove 536a and is fixed.

That is, in brief, the lower wire fixing member 536 is moved upward as the second tightening device 535 is rotated, so that the jumper wire W accommodated between the upper accommodating groove 534a and the lower accommodating groove 536a is fixed or released. At this time, similar to the first tightening device 523, the second tightening device 535 is rotated by using an insulation stick and so on, thereby being capable of moving the lower wire fixing member 536 upward.

In addition, the position adjustment part 530 includes the rotation adjustment part 537 that protrudes on the lower portion of the front surface of the moving body 531, and the rotation adjustment part 537 is configured to limit the rotation of the trap-type live wire terminal insulation cap C of the present disclosure as same as the protrusion part that is described above. That is, the rotation adjustment part 537 is configured to limit a downward rotation of the trap-type live wire terminal insulation cap C, so that work is smoothly performed.

Meanwhile, it is preferable that the upper wire fixing member 534 is coupled to the position adjustment part 530, i.e., the upper wire fixing member 534 is coupled to the front surface of the moving body 531 such that the upper wire fixing member 534 is capable of being rotated, and is configured to fix a rotation angle after the rotation angle is adjusted. This is to more smoothly and flexibly fix the jumper wire W to the upper accommodating groove 534a, in which the jumper wire W is rotated together with the lower wire fixing member 536 and is not cut.

In addition, in describing a configuration that fix the rotation angle after adjusting an angle of the upper wire fixing member 534 by rotating the upper wire fixing member 534, the configuration includes the rotation adjustment part 537 which protrudes on the lower portion of the front surface of the moving body 531 and in which the penetration hole 537a is formed in the vertical direction, and includes the rotation fixing member 538 which is inserted into and coupled to the lower portion of the penetration hole 537a of the rotation adjustment part 537 and which is provided with the locking member 538a configured to be moved upward and downward along the penetration hole 537a. Furthermore, the upper wire fixing member 534 includes the angle adjustment groove 534d including a plurality of angle adjustment grooves 534d formed in the rear side of the lower surface of the upper wire fixing member 534 in the left and right directions, the angle adjustment grooves 534d being configured such that the locking member 538a of the rotation fixing member 538 is capable of being inserted and pulled.

As described above, the rotation adjustment part 537 has the penetration hole 537a and is configured to limit the downward rotation of the trap-type live wire terminal insulation cap C of the present disclosure. Furthermore, as the upper portion of the rotation fixing member 538 is coupled to the penetration hole 537a and the locking member 538a of the rotation fixing member 538 is moved upward, the upper portion of the locking member 538a is inserted into any one of the angle adjustment grooves 534d of the upper wire fixing member 534, so that the upper wire fixing member 534 is fixed without rotation.

In addition, the upward and downward movement of the locking member 538a is performed when the worker rotates the locking member 538a since the upper portion of the rotation fixing member 538 is coupled to the penetration hole 537a of the rotation adjustment part 537 and the locking member 538a penetrates the rotation fixing member 538 and the locking member 537a is hinge-coupled to the rotation fixing member 538.

That is, after the locking member 538a is in a state in which the locking member 538a is moved downward or the locking member 538a is rotated and moved downward by the worker, when the worker rotates the upper wire fixing member 534 and then the worker rotates the locking member 538a and moves the locking member 538a upward, the upper portion of the locking member 538a is inserted into any one of the angle adjustment grooves 534d formed in the rear lower surface of the upper wire fixing member 534, thereby realizing the angle adjustment of the upper wire fixing member 534.

Figure 28:
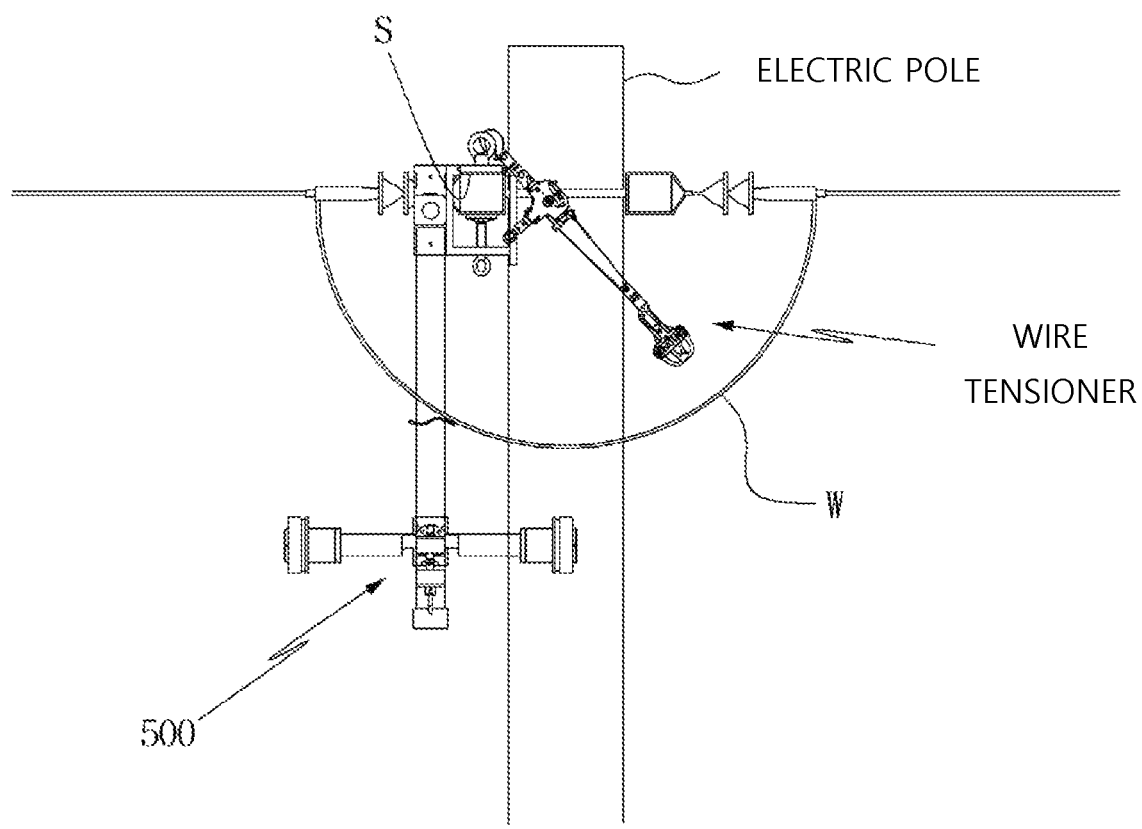
FIG. 28 is a schematic view illustrating a preparation process of the indirect live wire insulation method for the jumper wire using the trap-type live wire terminal insulation cap, in which a wire tensioner is coupled to a wire tensioner ring of the crossarm-type jumper wire supporting member according to another embodiment of the present disclosure.
Figure 29:
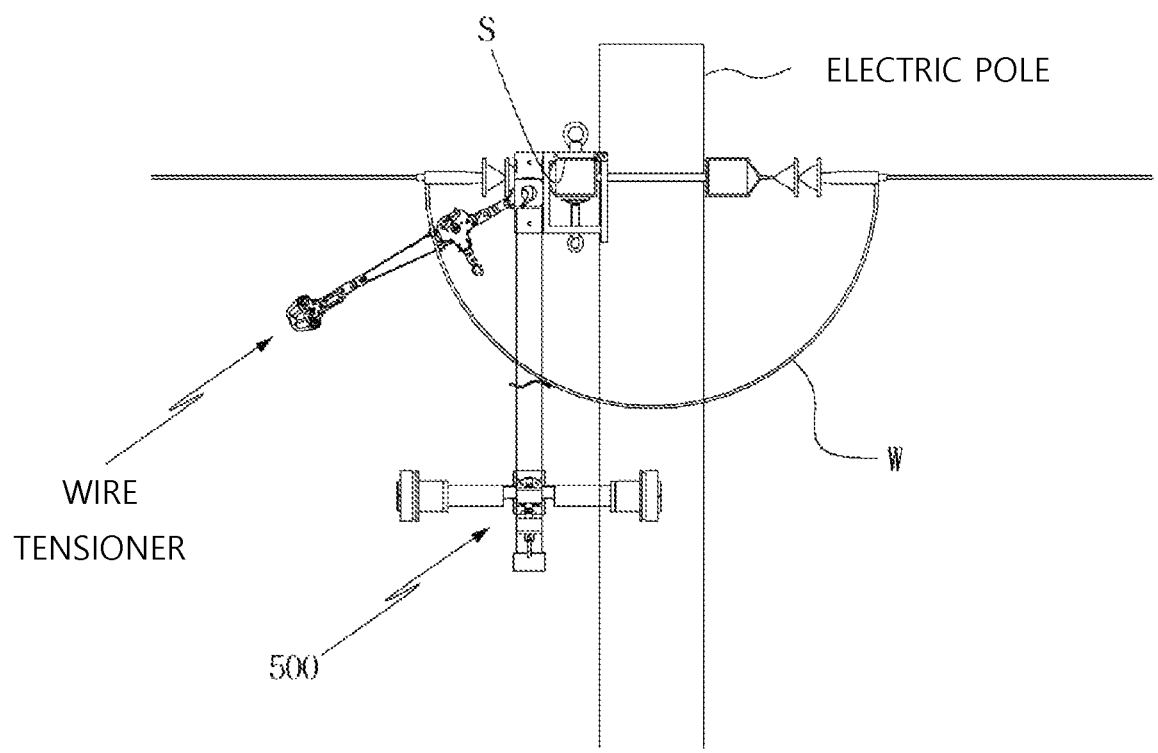
FIG. 29 is a schematic view illustrating a preparation process of the indirect live wire insulation method for the jumper wire using the trap-type live wire terminal insulation cap, in which the wire tensioner is coupled to a wire tensioner coupling hole of the crossarm-type jumper wire supporting member according to another embodiment of the present disclosure.

Meanwhile, as illustrated in FIG. 27 to FIG. 29, another embodiment of the crossarm-type jumper wire supporting member 500 may be provided. In another embodiment, the crossarm-type jumper wire supporting member 500 is provided with a wire tensioner ring 520a so that a wire tensioner is prepared together by hanging a ring formed on the wire tensioner on the wire tensioner ring 520a, and is provided with a wire tensioner coupling hole 520b.

Specifically, in another embodiment of the crossarm-type jumper wire supporting member 500, the crossarm-type jumper wire supporting member 500 includes the base frame 510, the fixing part 520, and the position adjustment part 530 as same as in an embodiment, and further includes the wire tensioner ring 520a provided on the upper surface of the fixing part 520.

As illustrated in FIG. 28, the wire tensioner ring 520a has an effect that a ring of a wire tensioner is hung and coupled to the wire tensioner ring 520a before the crossarm-type jumper wire supporting member 500 is installed on the crossarm S, and has an effect that the wire tensioner is capable of being easily and conveniently used after the crossarm-type jumper wire supporting member 500 is installed on the crossarm S without additionally moving the wire tensioner upward.

In addition, as in an embodiment described above, the crossarm-type jumper wire supporting member 500 has the front side thereof opened, and includes a door 520c hinge-coupled to the opened front side of the crossarm-type jumper wire supporting member 500 and configured to be opened and closed. Furthermore, after the crossarm S is inserted into the fixing part 520 of the crossarm-type jumper wire supporting member 500, the door 520c closes the opened front side and is fixed, so that the crossarm S is prevented from being separated, thereby realizing an effect of performing a safer work.

In addition, as in the embodiment described above, the crossarm-type jumper wire supporting member 500 includes the coupling part 521 which is formed such that the coupling part 521 is coupled to the upper portion of the base frame 510 and which is formed on the rear side of the crossarm-type jumper wire supporting member 500, and the trap-type live wire terminal insulation cap C of the present disclosure is capable of being positioned above or below the crossarm S by using the coupling part 521.

At this time, in a situation in which the coupling part 521 is coupled to the base frame 510 such that the trap-type live wire terminal insulation cap C of the present disclosure is positioned above the crossarm S, when the wire tensioner is hung and coupled to the wire tensioner ring 520a, the wire tensioner is positioned at the front side of the fixing part 520. Therefore, as the wire tensioner is positioned at the opened front side of the fixing part 520, the crossarm-type jumper wire supporting member 500 may be difficult to be installed on the crossarm S due to the wire tensioner, so that the coupling part 521 may include the wire tensioner coupling hole 520b to which the wire tensioner is capable of being hung and coupled such that the wire tensioner is positioned at the rear side of the fixing part 520.

In addition, the wire tensioner coupling hole 520b is formed such that the wire tensioner coupling hole 520b is positioned at the center of the coupling part 521, so that the fixing part 520 is stably and firmly coupled to the base frame 510. That is, the coupling part 521 is stably and firmly coupled to the base frame 510.

In addition, the fixing part 520 includes the first tightening device 523 which penetrates the lower portion of the fixing part 520 and which is screw-coupled and configured to be moved upward and downward, and the first tightening device 523 fixes the crossarm S, thereby realizing an effect of maintaining the crossarm-type jumper wire supporting member 500 to be firmly fixed to the crossarm S.

That is, when the crossarm S is inserted into the inner side of the fixing part 520, the first tightening device 523 moved downward. Then, after the crossarm S is inserted into the fixing part 520, the first tightening device 523 is moved upward and is in close contact with the lower portion of the crossarm S and supports the crossarm S. At the same time, the first tightening device 523 presses the crossarm S upward so that the upper portion of the crossarm S is in close contact with the inner upper surface of the fixing part 520, so that the crossarm-type jumper wire supporting member 500 is firmly installed on the crossarm S.

In addition, as in the embodiment, the crossarm-type jumper wire supporting member 500 in another embodiment may include the square crossarm fixing member 524 having an upper portion thereof coupled to the inner upper portion of the fixing part 520, so that the crossarm-type jumper wire supporting member 500 is capable of being installed on both the single-type crossarm and the square crossarm by using the square crossarm fixing member 524.

As a result, since the trap-type live wire terminal insulation cap C of the present disclosure is installed at a fixed position by using the hanger-type jumper wire supporting member 400 or the crossarm-type jumper wire supporting member 500, the cut jumper wire W is fixed at a predetermined position and is wrapped, insulated, and protected, so that safety incidents caused by high voltage current may be prevented and also work efficiency may be increased.

Next, in describing the indirect live wire insulation method for the jumper wire using the trap-type live wire terminal insulation cap C, the method includes: the first preparation process S10 in which the hanger-type jumper wire supporting member 400 or the crossarm-type jumper wire supporting member 500 is installed around a jumper wire W that requires work, a second preparation process S20 in which the rear side of the trap-type live wire terminal insulation cap C is coupled to the hanger-type jumper wire supporting member 400 or the crossarm-type jumper wire supporting member 500, and the fastening process S40 in which the terminal of the jumper wire W that is cut is inserted into and fixed to the trap-type live wire terminal insulation cap C.

Specifically, in the first preparation process S10, a worker determines whether any one of the jumper wire W which is required to be worked on and which is an electric wire L having tension around a jumper wire, a suspension insulator, or a crossarm S is capable of being used, and then the worker installs a pair of hanger-type jumper wire supporting members 400 or the crossarm-type jumper wire supporting member 500 on the electric wire L having tension, the suspension insulator, or the crossarm S. At this time, it is preferable that the hanger-type jumper wire supporting member 400 is installed according to a cutting part of the jumper wire W when the jumper wire W is cut.

In the second preparation process S20, the rear side of the trap-type live wire terminal insulation cap C, i.e., the coupling part 113 formed at the rear side of the rear body 110 is coupled to the hanger-type jumper wire supporting member 400 or the crossarm-type jumper wire supporting member 500 installed in the first preparation process S10, and respective trap-type live wire terminal insulation caps C are installed on the pair of quick links 540 of the hanger-type jumper wire supporting members 400 or one or two trap-type live wire terminal insulation caps C are coupled to the coupling protrusion 533 of the crossarm-type jumper wire supporting member 500.

At this time, the second preparation process S20 may further include a fixing process S25 in which the jumper wire W is fixed between the upper accommodating groove 534a and the lower accommodating groove 536b when one jumper wire W which does not require work but which is positioned around the jumper wire W that requires work so that one jumper wire W is required to be separately fixed exists while the crossarm-type jumper wire supporting member 500 is used.

After then, the worker uses the insulation stick and so on so that one jumper wire W is in a safely and temporarily fixed state, and then the fastening process S40 is performed immediately.

In the fastening process S40, terminals of the cut jumper wires W are inserted into and fixed to the pair of trap-type live wire terminal insulation caps C so that the cut jumper wires W are insulated and protected, in which the trap-type live wire terminal insulation caps C are the pair of trap-type live wire terminal insulation caps C installed on the pair of hanger-type jumper wire supporting members 400 or the pair of trap-type live wire terminal insulation caps C installed on the crossarm-type jumper wire supporting member 500 in the second preparation process S20.

At this time, before the fastening process S40, a third preparation process S26 may be further included. In the third preparation process S26, the worker considers a length of the jumper wire W that is to be cut and considers a facing direction of the terminal of the jumper wire W after the jumper wire W is cut, and the worker adjusts a position of the trap-type live wire terminal insulation cap C.

In addition, in the third preparation process S26, when the hanger-type jumper wire supporting member 400 is used, the worker sets positions of the pair of trap-type live wire terminal insulation caps C and sets directions of the opened front sides by using the insulation stick and so on.

In addition, in the third preparation process S26, when the crossarm-type jumper wire supporting member 500 is used, the worker determines whether the cut electric wire is fixed to a position above or below the crossarm S, then the coupling part 521 formed on the upper portion of the lower portion of the fixing part 520 is coupled to the upper portion of the base frame 510, then then the position adjustment part 530 is slidably moved along the base frame 510 so as to adjust the position, and then the worker rotates the pair of trap-type live wire terminal insulation caps C upward by using the insulation stick and so on, thereby setting the positions and the opened front sides of the trap-type live wire terminal insulation caps C. At this time, the worker may require a number of workers in order to improve the safety of the high voltage current.

The foregoing is specific description of the technical features of the present disclosure for the preferred embodiments of the present disclosure. In addition, those skilled in the art will appreciate that various modifications, additions and substitutions are possible, without departing from the scope and spirit of the present disclosure.

The invention claimed is:

1. A trap-type live wire terminal insulation cap comprising:
   a base body (100) into which a terminal of a jumper wire (W) is inserted, the base body (100) having a front side of an outer circumference provided with a plurality of operation holes (112) formed therethrough;
   a plurality of gripping members (200) having front sides thereof hinge-coupled to the operation holes (112) of the base body (100), the gripping members (200) having respective links (210) that protrude on front side upper portions of the gripping members (200);
   an operation head (300) slidably coupled to the front side of the outer circumference of the base body (100) such that the operation head (300) is elastically supported rearward, the operation head (300) which has a front surface provided with respective operation grooves (310) corresponding to the operation holes (112) and to which the links (210) of the gripping members (200) are hinge-coupled to the operation grooves (310); and
   a hanger-type jumper wire supporting member (400) having an upper portion coupled to an electric wire (L) having tension or to a suspension insulator and having a lower portion to which a rear side of the base body (100) is coupled.

2. The trap-type live wire terminal insulation cap of claim 1, wherein the base body (100) comprises:
   a rear body (110) into which the terminal of the jumper wire (W) is inserted and which has a front side of an outer circumference provided with the plurality of operation holes (112) formed therethrough; and
   a front body (120) into which a front side of the rear body (110) is inserted and coupled, the front body (120) having a rear surface provided with a plurality of installation grooves (122) so as to be positioned outside the rear body (110), and the front body (120) being provided with respective elastic members (124) installed in the installation grooves (122),
   wherein the operation head (300) comprises an elastic supporting part (320) which protrudes on an outer circumference of the operation head (300) and which supports rear sides of the elastic members (124).

3. The trap-type live wire terminal insulation cap of claim 1, wherein the gripping members (200) comprise respective teeth parts (220) formed on rear lower surfaces of the gripping members (200).

4. The trap-type live wire terminal insulation cap of claim 3, wherein the teeth parts (220) are formed in curved shapes.

5. The trap-type live wire terminal insulation cap of claim 1, wherein the hanger-type jumper wire supporting member (400) comprises:
   a coupling ring (410) having an upper portion hung and coupled to the electric wire (L) having tension or to the suspension insulator; and
   an insulation rope (420) having an upper portion coupled to a lower portion of the coupling ring (410) and having a lower portion coupled to the rear side of the base body (100).

6. The trap-type live wire terminal insulation cap of claim 5, wherein the coupling ring (410) comprises:

a first hook (412) having an upper inner side provided with a first hanging groove into which the electric wire (L) having tension or the suspension insulator is capable of being inserted and hung, the first hook (412) having a first side surface provided with a rail groove (412a) formed in an arc shape and having an upper rear side opened;

a separation prevention lever (414) having an upper terminal opened such that a second hanging groove corresponding to the first hanging groove of the first hook (412) is formed, the separation prevention lever (414) having an upper portion formed in a shape corresponding to a shape of the rail groove (412a) of the first hook (412) and coupled to the rail groove (412a) such that the separation prevention lever (414) is capable of being rotated along the rail groove (412a), and the separation prevention lever (414) having a lower portion that protrudes toward the opened upper rear side of the first hook (412); and a second hook (416) having a third hanging groove corresponding to the first hanging groove of the first hook (412), the second hook (416) being coupled to the first side surface of the first hook (412) and closing a first side of the rail groove (412a) of the first hook (412) and a first side of the opened upper rear side of the first hook (412).

7. An indirect live wire insulation method for a jumper wire, the method using the trap-type live wire terminal insulation cap (C) of claim 1, and the method comprising:

a first preparation process (S10) in which the hanger-type jumper wire supporting member (400) or the crossarm-type jumper wire supporting member (500) is installed around the jumper wire (W) that requires work;

a second preparation process (S20) in which a rear side of the trap-type live wire terminal insulation cap (C) is coupled to the hanger-type jumper wire supporting member (400) or the crossarm-type jumper wire supporting member (500);

a cutting process S30 in which the jumper wire W that requires work is cut; and a fastening process (S40) in which a terminal of the jumper wire (W) that is cut is inserted into and fixed to the trap-type live wire terminal insulation cap (C).

8. A trap-type live wire terminal insulation cap comprising:

a base body (100) into which a terminal of a jumper wire (W) is inserted, the base body (100) having a front side of an outer circumference provided with a plurality of operation holes (112) formed therethrough;

a plurality of gripping members (200) having front sides thereof hinge-coupled to the operation holes (112) of the base body (100), the gripping members (200) having respective links (210) that protrude on front side upper portions of the gripping members (200);

an operation head (300) slidably coupled to the front side of the outer circumference of the base body (100) such that the operation head (300) is elastically supported rearward, the operation head (300) which has a front surface provided with respective operation grooves (310) corresponding to the operation holes (112) and to which the links (210) of the gripping members (200) are hinge-coupled to the operation grooves (310); and a crossarm-type jumper wire supporting member (500) having an upper portion coupled to a crossarm(S) and to which a rear side of the base body (100) is coupled to at least one of both sides of the crossarm-type jumper wire supporting member (500).

9. The trap-type live wire terminal insulation cap of claim 8, wherein the base body (100) comprises:

a rear body (110) into which the terminal of the jumper wire (W) is inserted and which has a front side of an outer circumference provided with the plurality of operation holes (112) formed therethrough; and a front body (120) into which a front side of the rear body (110) is inserted and coupled, the front body (120) having a rear surface provided with a plurality of installation grooves (122) so as to be positioned outside the rear body (110), and the front body (120) being provided with respective elastic members (124) installed in the installation grooves (122), wherein the operation head (300) comprises an elastic supporting part (320) which protrudes on an outer circumference of the operation head (300) and which supports rear sides of the elastic members (124).

10. The trap-type live wire terminal insulation cap of claim 8, wherein the gripping members (200) comprise respective teeth parts (220) formed on rear lower surfaces of the gripping members (200).

11. The trap-type live wire terminal insulation cap of claim 10, wherein the teeth parts (220) are formed in curved shapes.

12. The trap-type live wire terminal insulation cap of claim 8, wherein the crossarm-type jumper wire supporting member (500) comprises:

a base frame (510) having a length in a vertical direction;

a fixing part (520) coupled to an upper portion of the base frame (510) and installed on the crossarm(S); and a position adjustment part (530) slidably coupled to the base frame (510) and coupled to the base frame (510) such that the rear side of the base body (100) is capable of being rotated.

13. The trap-type live wire terminal insulation cap of claim 12, wherein the fixing part (520) comprises a coupling part (521) having a front side opened, the coupling part (521) being formed on an upper portion and a lower portion of the fixing part (520) so as to be coupled to the upper portion of the base frame (510).

14. The trap-type live wire terminal insulation cap of claim 12, wherein the fixing part 520 comprises:

a lower supporting member (522) hinge-coupled to a rear side of the fixing part (520); and a first tightening device (523) hinge-coupled to a rear lower portion of the fixing part (520), the first tightening device (523) having an upper portion hinge-coupled to a rear side of the lower supporting member (522) and being configured to move the lower supporting member (522) up and down.

15. The trap-type live wire terminal insulation cap of claim 12, wherein the fixing part (520) comprises a square crossarm fixing member (524) having an upper portion coupled to an inner upper portion of the fixing part (520).

16. The trap-type live wire terminal insulation cap of claim 12, wherein the position adjustment part (530) comprises:

a moving body (531) slidably coupled to the base frame (510);

a locking part (532) installed on a rear side of the moving body (531) and configured to fix or release a sliding movement of the moving body (531); and a coupling protrusion (533) that protrudes on a front surface of the moving body (531), the coupling protrusion (533) being coupled such that the rear side of the base body (100) is capable of being rotated.

17. The trap-type live wire terminal insulation cap of claim 16, wherein the coupling protrusion (533) comprises a pair of coupling protrusions (533) that protrudes from both sides of a rear surface of the moving body (531).

18. The trap-type live wire terminal insulation cap of claim 16, wherein the position adjustment part (530) comprises:
- an upper wire fixing member (534) having an upper portion of a rear surface thereof coupled to an upper portion of a front surface of the moving body (531) such that the upper wire fixing member (534) is capable of being rotated, the upper wire fixing member (534) having a front side of a lower surface provided with an upper accommodating groove (534a) in which the jumper wire (W) is capable of being accommodated;
- a second tightening device (535) having an upper portion which penetrates a rear side of the lower surface of the upper wire fixing member (534) and which is screw-coupled to the upper wire fixing member (534); and
- a lower wire fixing member (536) having a rear side through which the second tightening device (535) penetrates and to which the second tightening device (535) is screw-coupled, the lower wire fixing member (536) being installed spaced apart from a lower portion of the upper wire fixing member (534), and the lower wire fixing member (536) having a front side of an upper surface provided with a lower accommodating groove (536a) in which the jumper wire (W) is capable of being accommodated.

19. The trap-type live wire terminal insulation cap of claim 18, wherein the position adjustment part (530) comprises:
- a rotation adjustment part (537) which protrudes on a lower portion of the front surface of the moving body (531) and in which a penetration hole (537a) is formed in the vertical direction; and
- a rotation fixing member (538) which is inserted into and coupled to a lower portion of the penetration hole (537a) of the rotation adjustment part (537) and which is provided with a locking member (538a) configured to be moved upward and downward along the penetration hole (537a),
wherein the upper wire fixing member (534) comprises an angle adjustment groove (534d) comprising a plurality of angle adjustment grooves (534d) formed in the rear side of the lower surface of the upper wire fixing member (534) in left and right directions, the angle adjustment grooves (534d) being configured such that the locking member (538a) of the rotation fixing member (538) is capable of being inserted and pulled.

* * * * *